US008366902B2

(12) United States Patent
Hawkes et al.

(10) Patent No.: US 8,366,902 B2
(45) Date of Patent: Feb. 5, 2013

(54) METHODS AND SYSTEMS FOR PRODUCING SYNGAS

(75) Inventors: Grant L. Hawkes, Sugar City, ID (US); James E. O'Brien, Idaho Falls, ID (US); Carl M. Stoots, Idaho Falls, ID (US); J. Stephen Herring, Idaho Falls, ID (US); Michael G. McKellar, Idaho Falls, ID (US); Richard A. Wood, Idaho Falls, ID (US); Robert A. Carrington, Idaho Falls, ID (US); Richard D. Boardman, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1335 days.

(21) Appl. No.: 12/054,269

(22) Filed: Mar. 24, 2008

(65) Prior Publication Data

US 2009/0235587 A1    Sep. 24, 2009

(51) Int. Cl.
    *C25B 1/04* (2006.01)
(52) U.S. Cl. .................................. 205/637; 205/628
(58) Field of Classification Search .................. 205/628, 205/637
    See application file for complete search history.

(56) References Cited

U.S. PATENT DOCUMENTS

| 3,873,845 | A | * | 3/1975 | Osthaus ............................ 290/2 |
| 4,099,383 | A | * | 7/1978 | Paull et al. ...................... 60/648 |
| 4,454,427 | A | * | 6/1984 | Sosnowski et al. ............... 290/2 |
| 5,068,254 | A | * | 11/1991 | Posthuma et al. ............ 518/705 |
| 6,428,678 | B1 | | 8/2002 | Rennebeck |
| 6,645,442 | B2 | | 11/2003 | Kaneko et al. |
| 6,805,195 | B2 | | 10/2004 | Vinegar et al. |
| 2004/0191595 | A1 | * | 9/2004 | McElroy et al. ................. 429/21 |
| 2004/0202914 | A1 | * | 10/2004 | Sridhar et al. .................. 429/34 |
| 2006/0211777 | A1 | | 9/2006 | Severinsky |
| 2006/0265953 | A1 | | 11/2006 | Hobbs |
| 2007/0045125 | A1 | | 3/2007 | Hartvigsen et al. |
| 2007/0122339 | A1 | * | 5/2007 | Kulkarni et al. ............. 423/652 |
| 2008/0023338 | A1 | | 1/2008 | Stoots et al. |
| 2008/0029388 | A1 | * | 2/2008 | Elangovan et al. ........... 204/242 |
| 2008/0124255 | A1 | * | 5/2008 | Johnston ....................... 422/190 |

FOREIGN PATENT DOCUMENTS

| EP | 1 657 409 A1 | 5/2006 |
| JP | 2002147707 A * | 5/2002 |
| WO | WO 2008062208 A2 * | 5/2008 |

OTHER PUBLICATIONS

Agrawal et al., "Sustainable fuel for the transportation sector," PNAS, vol. 104, No. 12, Mar. 14, 2007, pp. 4828-4833.

(Continued)

*Primary Examiner* — Nicholas A. Smith
(74) *Attorney, Agent, or Firm* — TraskBritt

(57) ABSTRACT

Methods and systems are provided for producing syngas utilizing heat from thermochemical conversion of a carbonaceous fuel to support decomposition of at least one of water and carbon dioxide using one or more solid-oxide electrolysis cells. Simultaneous decomposition of carbon dioxide and water or steam by one or more solid-oxide electrolysis cells may be employed to produce hydrogen and carbon monoxide. A portion of oxygen produced from at least one of water and carbon dioxide using one or more solid-oxide electrolysis cells is fed at a controlled flow rate in a gasifier or combustor to oxidize the carbonaceous fuel to control the carbon dioxide to carbon monoxide ratio produced.

4 Claims, 6 Drawing Sheets

OTHER PUBLICATIONS

Cifre et al., "Renewable Hydrogen Utilisation for the Production of Methanol," Cranfield University, UK date unknown, pp. 1-18.

Park et al., "Synthetic Diesel Fuel Production from Carbonaceous Feed Stocks," University of California, Riverside, date unknown, 6 pages.

Probstein et al., "Biomass Conversion," Synthetic Fuels, Chapter Eight, Dover Publications, Inc., 1982, pp. 381-410.

Specht et al., "Synthesis of Methanol From Biomass/CO2 Resources," Greenhouse Gas Control Technologies, Eliasson et al. (Eds.), p. 723, Pergamon, Amsterdam, 1999, (6 pages).

Forsberg, Charles W., "Meeting U.S. Liquid Transport Fuel Needs with a Nuclear Hydrogen Biomass System," Oak Ridge National Laboratory, 2007, 16 pages.

* cited by examiner

METHODS AND SYSTEMS FOR PRODUCING SYNGAS

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present invention relate, generally, to the production of syngas and, more particularly, to methods and systems for producing syngas from a carbonaceous fuel, such as biomass, coal, or other solid or nonconventional heavy hydrocarbons by utilizing the heat from thermochemical conversion of the carbonaceous fuel to support electrolysis of steam and/or co-electrolysis of steam and carbon dioxide in one or more solid-oxide electrolysis cells.

BACKGROUND

As energy consumption in the United States and throughout the world continues to increase, additional methods for environmentally clean energy conversion that can convert biomass, coal, or other solid or nonconventional heavy hydrocarbon energy resources to hydrogen, synthetic fuels and chemicals are desired. Concerns about the increased wastes and pollutants produced by many of the conventional energy conversion processes, and the low efficiencies of such processes, have led to further research for cleaner, more efficient processes.

In response to the increasing energy demands and the desire to reduce or eliminate pollutants, new cleaner, energy conversion processes that can utilize biomass, coal, or other solid or nonconventional heavy hydrocarbons are being sought. A known process for conversion of these energy resources to cleaner fuels includes synthetic fuels, often referred to as "synfuels," which are made from synthesis gas, often referred to as "syngas." Syngas includes a mixture of varying amounts of carbon monoxide (CO) and hydrogen ($H_2$) that may be converted to form hydrogen, synfuels, methanol or chemicals. Production of synfuels from syngas may be performed using a variety of processes including a Fischer-Tropsch process to convert the carbon monoxide and hydrogen into liquid hydrocarbons as shown below in Reaction 1:

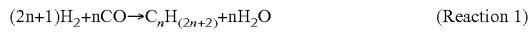

$$(2n+1)H_2 + nCO \rightarrow C_nH_{(2n+2)} + nH_2O \quad \text{(Reaction 1)}$$

The synfuels produced using the Fischer-Tropsch process may include high purity, low sulfur, fuels, often referred to as "Fischer-Tropsch liquids," which have fewer pollutants than naturally occurring fuels or fuels processed from naturally occurring oil deposits.

Another approach is to convert syngas into methanol, which may be converted to gasoline, olefins, or aromatics. Syngas may be converted to methanol using a copper or zinc catalyst such as a modified ZSM-5 catalyst.

High temperature solid-oxide fuel cells may be used to produce electricity and water from hydrogen and oxygen ($O_2$). When run in reverse, the solid-oxide fuel cells are called solid-oxide electrolysis cells and are able to electrolytically reduce and split water into hydrogen and oxygen and carbon dioxide into carbon monoxide and oxygen. The water may be converted into hydrogen, which may be combined with carbon monoxide to form syngas. In a solid-oxide electrolysis cell, the anode is the reducing gas electrode and the cathode is the oxidant-side electrode. When operated in reverse, as a solid-oxide electrolysis cell, the anode is the oxidant-side electrode and the cathode is the reducing gas electrode. Furthermore the solid-oxide electrolysis cell may be used to co-electrolyze a mixture of water and carbon dioxide to produce syngas.

Improvements to systems and processes for producing syngas are continually sought after by various industries. It would be beneficial to develop efficient systems and methods of producing syngas while minimizing carbon emissions.

BRIEF SUMMARY OF THE INVENTION

Various embodiments of the present invention include methods and systems for producing hydrogen or syngas by employing thermochemical conversion of a carbonaceous fuel to produce heat to support one or more solid-oxide electrolysis cells. By utilizing heat produced during the thermochemical conversion of the carbonaceous fuel, an external heat source is not needed in the methods and systems. According to various embodiments, configurations of the systems may utilize one or more solid-oxide electrolysis cells that are integrated with the gasification system to utilize high-temperature energy available from the gasifier to provide part of the energy required to reduce water to hydrogen and oxygen and carbon dioxide to carbon monoxide and oxygen. A portion of the oxygen produced by reducing water and carbon dioxide may be directed to the thermochemical conversion of the carbonaceous fuel to control the ratio of carbon dioxide to carbon monoxide produced therein. Additionally, various embodiments may employ a counter-flow heat exchange device, or other suitable heat transfer device, to transfer heat produced during thermochemical partial oxidation of the carbonaceous fuel to water or carbon dioxide for electrolysis. Conventionally, an external heat source is employed in the production of syngas. The present invention enables the heat produced during the oxidation of the carbonaceous fuel to be used in the production of syngas. Therefore, a means of producing hydrogen as well as syngas in the absence of an external heat source is provided.

In accordance with one embodiment of the present invention, a method is provided for producing syngas. The method includes thermochemically converting a carbonaceous fuel to produce a heated mixed gas. The heated mixed gas may include water, hydrogen, carbon monoxide and carbon dioxide. Steam may be produced by transferring heat from the heated mixed gas produced by the thermochemical conversion of the carbonaceous fuel. Utilizing the heat from the mixed gases produced by the thermochemical conversion process eliminates the need for an external heat source. The steam may be introduced to at least one solid-oxide electrolysis cell and may be decomposed to produce hydrogen and oxygen. The hydrogen produced by electrolysis of steam may be combined with the heated mixed gas from the gasifier to produce additional syngas. The thermochemical conversion of the carbonaceous fuel may be performed in the presence of a portion of the oxygen produced by electrolysis of steam to control the ratio of carbon dioxide to carbon monoxide in the mixed gas. By augmenting the thermochemical conversion process using oxygen produced by transferring heat from in the mixed gas produced during thermochemical conversion of the carbonaceous fuel, carbon may be used more efficiently. For example, the method may involve recirculating a sufficient amount of oxygen produced by the at least one solid-oxide electrolysis cell such that the method is substantially carbon-neutral.

In accordance with another embodiment of the present invention, a method is provided for forming syngas. The method includes producing heat and a mixed gas by gasifying a carbonaceous fuel, such as biomass. The mixed gas may contain, among other constituents, carbon monoxide, carbon dioxide, water, and hydrogen. Impurities may be removed from the mixed gas to generate a feed stream. For example, the removal of impurities from the mixed gas may be performed by employing a quenching process to condense impurities, such as tar and oils, out of the mixed gas. The heat produced by gasifying the carbonaceous fuel may be transferred to the feed stream to convert at least a portion of the water in the feed stream to steam. The steam may be introduced to at least one solid-oxide electrolysis cell. The carbon dioxide and steam in the feed stream may be electrolyzed in the at least one solid-oxide electrolysis cell to produce carbon monoxide, hydrogen and oxygen. The carbon monoxide and hydrogen may be separated from the oxygen to form syngas. By way of non-limiting example, a portion of the hydrogen gas may be used to perform a hydrogen addition reaction to increase the ratio of hydrogen to carbon in a hydrocarbon fuel. A portion of the oxygen may be recirculated to and introduced into the gasifier to control the ratio of carbon dioxide and carbon monoxide in the mixed gas.

In accordance with a further embodiment of the present invention, a process for forming syngas is provided. The method includes thermochemically converting a carbonaceous fuel to produce heat and a mixed gas. The mixed gas may include carbon dioxide, carbon monoxide, hydrogen and water. The heat produced by the thermochemical conversion may be transferred to a water stream to produce steam. The steam may be electrolyzed to produce hydrogen and oxygen. Also a portion of the carbon dioxide recovered from the mixed gas may be co-electrolyzed with water to produce carbon monoxide and hydrogen. The mixed gas may be cooled and water may be removed from the mixed gas to form syngas.

In accordance with a further embodiment of the present invention, a process for forming syngas is provided. The method includes thermochemically converting a carbonaceous fuel to produce heat and a mixed gas. The mixed gas may include carbon dioxide, carbon monoxide, hydrogen and water. The heat produced by the thermochemical conversion may be transferred to a water stream to produce steam. The steam may be electrolyzed to produce hydrogen and oxygen. In accordance with this embodiment, oxygen produced from the electrolysis cell may replace oxygen supplied to the process from external sources. At least a portion of the oxygen produced by electrolyzing steam is used to control the amount of oxidation during the thermochemical conversion of the carbonaceous fuel. This controlled oxidation will control the ratio of carbon dioxide to carbon monoxide produced when gasifying the carbonaceous fuel. At least a portion of the carbon dioxide and hydrogen in the mixed gas may be converted to carbon monoxide and water using, for example, a water shift reaction. The mixed gas may be cooled and water may be removed from the mixed gas to form syngas.

In accordance with a further embodiment of the present invention, a method for producing hydrogen gas is provided. The method includes gasifying a carbonaceous fuel to produce a mixed gas. The mixed gas may include carbon monoxide, carbon dioxide, hydrogen, water, and high-temperature steam. At least a portion of the high-temperature steam may be removed from the mixed gas. The at least a portion of the high-temperature stream may be electrolyzed in at least one solid-oxide electrolysis cell to form hydrogen and oxygen. At least a portion of the carbon monoxide and water in the mixed gas may be converted to hydrogen, carbon dioxide and oxygen. The oxygen may be directed to the gasification process to control the amount of oxidation so that a desired ratio of carbon dioxide to carbon monoxide may be produced. At least one impurity may be removed from the mixed gas. By way of non-limiting example, the hydrogen gas may be combined with carbon monoxide to form syngas. Alternatively, the hydrogen gas may be used in a hydrogen addition reaction to increase the ratio of hydrogen to carbon in hydrocarbon fuels.

In accordance with yet another embodiment of the present invention, a system is provided for producing syngas. The system includes an apparatus configured to thermochemically convert a carbonaceous fuel into heat and a mixed gas that may include carbon dioxide, carbon monoxide, hydrogen and water, a heat exchange device configured to transfer the heat produced during the conversion of the carbonaceous fuel to at least one of the carbon dioxide and water and at least one solid-oxide electrolysis cell operably coupled to at least one power source and configured to electrolyze at least one of water and carbon dioxide to form oxygen and at least one of hydrogen and carbon monoxide. The oxygen may be recirculated to the apparatus so that the ratio of carbon dioxide to carbon monoxide in the mixed gas may be controlled. For example, the ratio of carbon dioxide to carbon monoxide may be controlled so that the end product includes a desired molar ratio of hydrogen to carbon monoxide. The system utilizes heat in the mixed gas produced by the apparatus during the thermochemical conversion of the carbonaceous fuel to perform electrolysis or co-electrolysis and, thus, only electricity may be provided by an external source. Moreover, the location of the system is not dependent on the location of an external heat source.

DETAILED DESCRIPTION OF THE INVENTION

Figure 1:
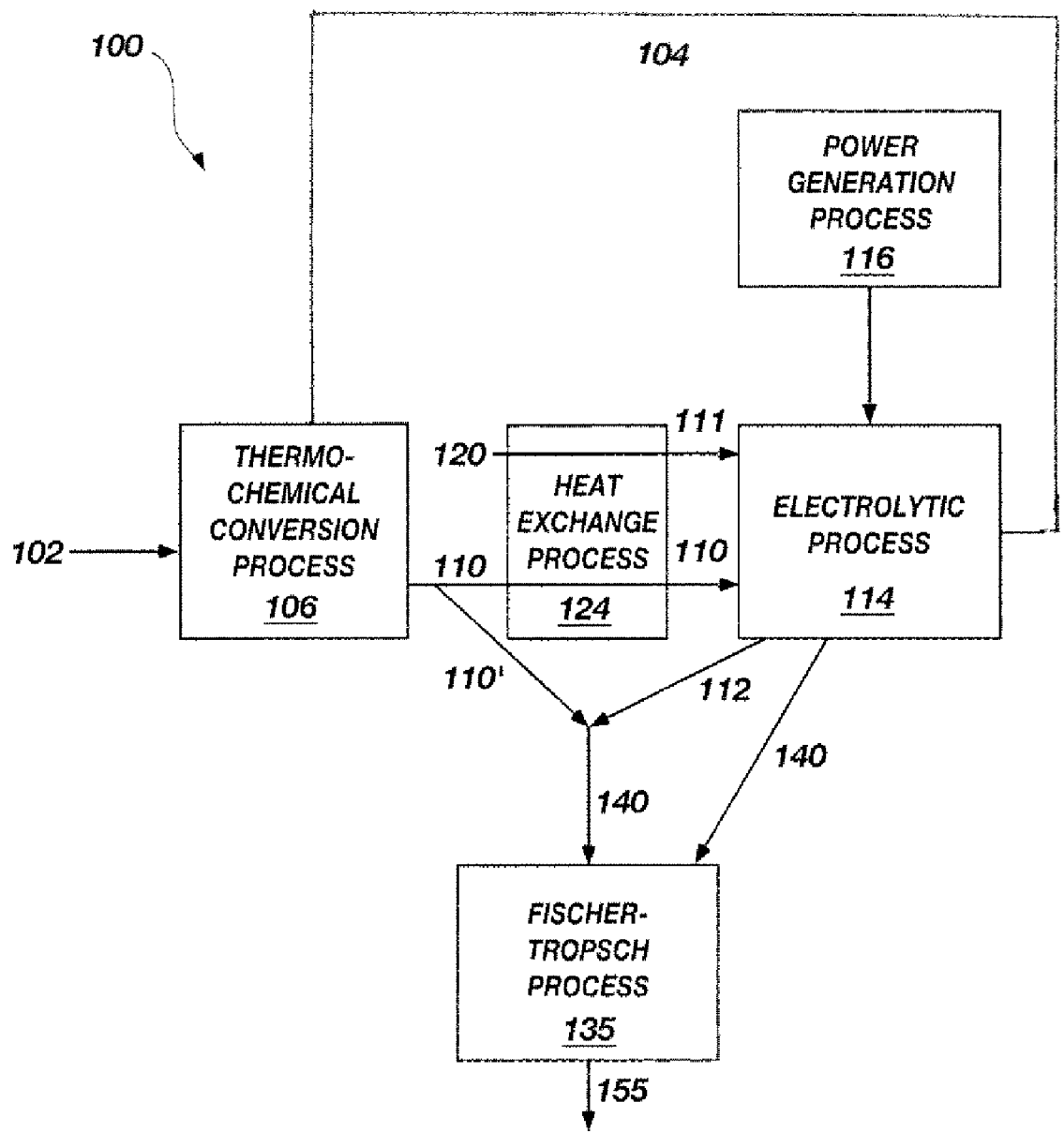
FIGS. 1 and 2 are schematic diagrams illustrating embodiments of syngas production processes, the embodiments comprising utilizing heat produced by the combustion of a carbonaceous fuel to support an electrolytic process and utilizing a gasification process, respectively.

Various embodiments of the present invention provide methods and systems for forming syngas by combining a thermochemical conversion process of a carbonaceous fuel with an electrolytic process. As used herein, the term "thermochemical conversion process" means and includes combustion, gasification, or pyrolyzation of the carbonaceous fuel. For convenience, the term "thermochemical conversion process," or grammatical equivalents thereof, is used to collectively refer to a combustion process, a gasification process, or a pyrolyzation process, while the terms "combustion," "gasification," or "pyrolyzation," or grammatical equivalents thereof, are used herein to refer to a specific type of thermochemical conversion process. The term "electrolytic process" means and includes a high temperature electrolysis or a co-electrolysis process. The term "high temperature electrolysis process" is used to refer to the electrolytic decomposition of water into hydrogen and oxygen at a temperature above 500° C., while the term "co-electrolysis process" is used to refer to the simultaneous electrolytic decomposition of water into hydrogen and oxygen and carbon dioxide into carbon monoxide and oxygen. For convenience, the term "electrolytic process" is used to collectively refer to the terms "high temperature electrolysis process" and "co-electrolysis process." The term "carbonaceous fuel," as used herein, means and includes a solid, liquid, or gas form of a combustible material composed of carbon-containing compounds. By way of example only, the carbonaceous fuel may be a biomass source composed primarily of vegetative matter, such as corn stover, wheat straw, barley straw, tree bark, wood waste, cellulose, bagasse, municipal wastes and combinations thereof. Additionally, the carbonaceous fuel may include a fossil fuel. By way of non-limiting example, the fossil fuel may be coal, such as brown coal, peat, wood, coke, soot, and combinations thereof, or a liquid fuel, such as tar sand oil, shale oil, and combinations thereof. The carbonaceous fuel may include combinations of any of the carbon-containing compounds mentioned above. The syngas produced from the carbonaceous fuel may be converted to synfuel using a process known in the art such as, for example, a Fischer-Tropsch process. Hydrogen and/or carbon monoxide produced from high temperature electrolysis of steam or carbon dioxide may be integrated with the thermochemical conversion of a carbonaceous fuel to produce hydrogen or syngas. By utilizing the carbonaceous fuel as a heat source to support the electrolytic process, syngas production may be performed at locations that are remote from an industrial process heat source, such as a nuclear power plant or solar concentrator. Oxygen produced from high temperature electrolysis of steam or carbon dioxide may be used to augment oxygen from an air separation unit or other oxygen enriching process or may replace such devices to produce all of the oxygen required to support production of hydrogen or syngas from a carbonaceous fuel.

The methods and systems described herein may be adapted for use in large-, medium- or small-scale process operations. According to embodiments, syngas may be produced utilizing heat from the combustion of a carbonaceous fuel to support at least one solid-oxide electrolysis cell operably coupled to receive electricity generated from at least one power source. The methods and systems may further include a Fischer-Tropsch process to effectively convert the syngas to a synfuel. By way of non-limiting example, the methods and systems may be varied to produce a syngas with a desired ratio of constituents, more specifically, a molar ratio of hydrogen ($H_2$) to carbon monoxide (CO) of about 2.12:1. If a cobalt catalyst is used to perform the Fischer-Tropsch, the hydrogen to carbon monoxide molar ratio may be in a range of from about 2.0:1 to about 2.12:1. If an iron catalyst is used in the Fischer-Tropsch process, a hydrogen to carbon monoxide molar ratio may be in a range of from about 0.8:1 to about 1.8:1. The molar ratio of hydrogen to carbon monoxide may be varied dependent on the reactor used in the thermochemical conversion apparatus, the process configuration or catalyst used to conduct the Fischer-Tropsch reaction.

As will be described in further detail hereinbelow, embodiments of the present invention may include a combination of heat exchangers, separation valves and reactors that may be employed in forming syngas while minimizing the release of carbon dioxide. The methods and systems for producing sygas by incorporating thermochemical conversion of a carbonaceous fuel with the electrolysis process may be configured to be a substantially carbon-neutral process. As used herein, the term "carbon-neutral" means and includes processing in which an amount of carbon, in the form of carbon dioxide, released is equal to the amount of the carbon in the carbon input. Additionally, "carbon-neutral" means and includes processing in which substantially all of the carbon input is used to form carbon output with substantially no carbon dioxide release. By completely recycling and co-electrolyzing the carbon dioxide in using the solid-oxide fuel cells to produce syngas for subsequent use in product formation, (i.e., zero) total carbon release may be achieved.

FIG. 1 is a simplified schematic of an embodiment of a hydrocarbon production process 100 that utilizes heat produced by the combustion of a carbonaceous fuel to support an electrolytic process 114. The hydrocarbon production processes 100 may include sub-processes, such as a thermochemical conversion process 106, the electrolytic process 114, a power generation process 116, a heat exchange process 124, a Fischer-Tropsch process 135, and, optionally, a water shift process (not shown), a water knockout process (not shown), and a gas cleanup process (not shown). The sub-processes of the hydrocarbon production process 100 are illustrated as sub-process blocks in FIG. 1.

By way of non-limiting example, the thermochemical conversion process 106 may be employed to convert an input 102 including the carbonaceous fuel to a product stream 110 that may include a mixed gas. As used herein, the term "mixed gas" means and includes a gaseous or substantially gaseous fluid having multiple components or constituents produced by the thermal conversion of the input 102. For example, a gasification process or a combustion process 106 may be used as the thermochemical conversion process 106 and the resulting mixed gas may include water, hydrogen, carbon dioxide, and carbon monoxide. Alternatively, a pyrolyzation process may be used as the thermochemical conversion process 106 and the mixed gas may include water, hydrogen, carbon dioxide, carbon monoxide and methane ($CH_4$). Other components may be produced during the thermochemical conversion process 106 as will be appreciated by those of ordinary skill in the art.

The input 102 may be thermochemically converted to the product stream 110 using a process such as gasification, combustion, or pyrolysis. In some embodiments, gasification may be employed as the thermochemical conversion process 106 to form the product stream 110 by introducing an oxidizing gas, such as oxygen or water, into a gasifier with the input 102 at high temperatures. The gasification process controls how much oxygen is burned with the carbonaceous fuel. The amount of oxygen introduced into the gasifier may be adjusted to vary the ratio of carbon dioxide to carbon monoxide produced by gasification of the carbonaceous fuel. By limiting or controlling the amount of oxygen introduced into the gasification process, the amount of carbon monoxide produced may be increased while the amount of carbon dioxide may be decreased. The gasification may be conducted in a conventional gasifier. Types of gasifiers known in the art, such as an updraft gasifier, a downdraft gasifier and a fluidized bed gasifier, may be used to covert the carbonaceous fuel to the product stream 110. In some embodiments, hydrogen or steam may be injected into the gasifier during gasification to suppress formation of carbon dioxide, thus, resulting in an increase in the ratio of carbon monoxide to carbon dioxide. The gasifier may be indirectly heated by transferring heat from a source, such as a combustor, a chemically regenerative heat carrier, or a heat storage phase-change material. Gasification of the carbonaceous fuel may be performed at temperatures in a range of from about 1400° C. to about 1600° C. In some embodiments, the product stream 110 formed by gasification of the carbonaceous fuel may include, for example, carbon monoxide, hydrogen, carbon dioxide and water.

In some embodiments, combustion may be used as the thermochemical conversion process 106 to convert the carbonaceous fuel in the input 102 to the product stream 110, which may include carbon dioxide, carbon monoxide, hydrogen, water and other components. During the combustion, oxygen may be introduced into a combustion chamber, where the oxygen reacts with, and at least partially oxidizes, the carbonaceous fuel to form the product stream 110 and heat. As the amount of oxygen used to combust the carbonaceous fuel is not controlled, the resulting produce stream 110 may include a high ratio of carbon dioxide to carbon monoxide. The combustion may be conducted in a conventional combustion chamber.

In additional embodiments, the carbonaceous fuel in the input 102 may be thermochemically converted in the absence of oxygen using pyrolysis as the thermochemical conversion process 106. The pyrolysis may be conducted in a conventional pyrolyzer. Types of pyrolyzers known in the art include, but are not limited to, a bubbling fluid bed, a circulating and transported bed, a cyclonic reactor, and an ablative reactor. Pyrolysis may be performed by heating the bed or reactor with a heat source (not shown). Heat sources may include, but are not limited to, combustion or gasification of a carbonaceous fuel, or electrical or nuclear process heat. The bed or reactor may operate at temperatures less than or equal to about 700° C.

After formation by the thermochemical conversion process 106, the product stream 110 may be processed, for example, using a quenching process (not shown), a water shift process (not shown), a water knockout process (not shown), and a gas cleanup process (not shown). In some embodiments, such processes may be used to alter the constituents of the product stream 110. Additionally, impurities incorporated into the product stream 110 during formation, such as tars and oils, may be removed from the product stream 110. As a non-limiting example, a quenching process (not shown) may be utilized to condense at least one impurity to remove the impurity from the products stream 110 such that components thereof, such as water, are suitable for electrolysis.

The product stream 110 may undergo a heat exchange process 124 to increase the temperature of at least one component in the mixed gas of the product stream 110 to facilitate the electrolytic process 114. By way of non-limiting example, the heat exchange process 124 may be performed using a counter-flow heat exchanger, such as a recuperator, a phase-change heat exchanger, a fluid heat exchanger, a plate heat exchanger, a regenerative heat exchanger, or any other device known in the art for exchanging heat between gas and fluid streams. The heat exchange process 124 may be used, for example, to convert water in the product stream 110 to steam. The heat exchange process 124 may be used to transfer heat from produced during the thermochemical conversion process 106 to components of the products stream 110 that will be electrolyzed. By transferring the heat produced during the thermochemical conversion process 106 to gases fed into the electrolytic process 114, an external heat source is not needed and the hydrocarbon production process 100 does not need to be co-located with an external heat source.

In some embodiments, the constitution of the product stream 110 may be altered by electrolyzing at least one of the components of the product stream 110 using the electrolytic process 114. The electrolytic process 114 may employ at least one solid oxide electrolysis cell to electrolyze the components, such as water and carbon dioxide, in the product stream 110. In additional embodiments, the product stream 110 may be altered using, for example, the water shift process or the water knockout process, to form product stream 110' that may be combined with hydrogen stream 112 produced by the electrolytic process 114.

The hydrocarbon production process 100 may further include a power generation process 116 for supplying electrical energy to the electrolytic process 114. For example, the power generation process 116 may include a direct current power source, such as an electric outlet connected to a commercial power grid, a generator powered by gas, electricity, wind, water, steam, nuclear energy, solar energy, or other energy source, a battery or battery array, or any other conventional power source capable of supplying an electrical current to the electrolytic process 114. A renewable power source may be employed as the power generation process 116 such that the hydrocarbon production process 100 may be configured to be substantially carbon-neutral. For example, the electrolytic process 114 may be located in proximity to a nuclear energy source such that electricity is readily available. Additionally, the electrolytic process 114 may be located in proximity to a conventional power plant such that steam and heat produced by the power plant may be used with the processes according to embodiments of the invention.

A single solid-oxide electrolysis cell or an array of such cells may be used to perform the electrolytic process 114. The solid-oxide electrolysis cell may include a cathode, an anode, and an electrolyte sandwiched or otherwise positioned between the cathode and anode. An electrical current may be provided to the anode and the cathode of the solid-oxide electrolysis cell by the power generation process 116.

During co-electrolysis, carbon dioxide ($CO_2$) and steam ($H_2O$) from the product stream 110 may be introduced on the cathode side of the solid-oxide electrolysis cell. The CO2 and the H2O may be simultaneously electrolyzed. These components of the product stream 110 may undergo electrolysis, forming two product streams: an oxygen stream 104 and a syngas stream 140. The steam, or water, decomposes in the presence of electrons supplied to the cathode by the power generation process 116 according to Reaction 2:

$$2H_2O + 4e^- \rightarrow 2H_2 + 2O^{-2} \qquad \text{(Reaction 2)}$$

The decomposition of water in the cathode produces hydrogen ($H_2$) and oxygen ions ($O^{-2}$). The oxygen ions may pass through the electrolyte to the anode, where the oxygen ions give up electrons, forming oxygen ($O_2$) that exits the electrolytic process 114 as oxygen stream 104. Hydrogen formed by the decomposition of water in the cathode may not pass through the electrolyte and may be collected. The oxygen stream 104 may pass through the solid-oxide electrolysis cell, exiting the anode of the solid-oxide electrolysis cell.

Carbon dioxide introduced on the cathode side of the solid-oxide electrolysis cell may undergo a similar electrolytic reaction as the steam, wherein the carbon dioxide decomposes in the presence of electrons supplied to the cathode by the power generation process 116 according to Reaction 3a:

$$2\,CO_2 + 4e^- \rightarrow 2\,CO + 2\,O^{-2} \qquad \text{(Reaction 3a)}$$

The carbon dioxide introduced to the cathode may also react with the hydrogen produced in the solid-oxide electrolysis cell to form carbon monoxide and water, for example, according to Reaction 3b:

$$CO_2 + H_2 \rightarrow CO + H_2O \qquad \text{(Reaction 3b)}$$

The carbon monoxide may combine with the hydrogen to form the syngas stream 140. The water by-product of the reaction of carbon dioxide with hydrogen may be decomposed according to Reaction 2 or portions of the water may be carried away. The syngas stream 140 may comprise components of syngas—carbon monoxide and hydrogen—which may exit the cathode of the solid-oxide electrolysis cell. The hydrogen stream 112 may be fed to a synfuels production process or may be stored as syngas.

Alternatively, high temperature electrolysis may be performed by introducing water or steam 111 on the cathode side of the solid-oxide electrolysis cell. Steam 111 may be formed by heating a water stream 120, such as boiler feed water, using the heat exchange process 124. Specifically, the heat from the product stream 110 produced during the thermochemical conversion process 106 may be captured and transferred to the water stream 120 using the heat exchange process 124. The transfer of heat from the product stream 110 to the water stream 120 to form steam 111 eliminates the need for a heat source other than the thermochemical conversion process 106. Therefore, the hydrocarbon production process 100 may be located remote from an industrial heat source. The steam 111 may undergo high temperature electrolysis using the electrolytic process 114 to form an oxygen stream 104 and a hydrogen stream 112. The high temperature electrolysis of carbon dioxide and steam into carbon monoxide and hydrogen may be performed at temperatures between about 500° C. and about 1200° C. In some particular embodiments, the high temperature electrolysis may be performed at a temperature between about 800° C. and 1000° C. The oxygen stream 104 may pass through the solid-oxide electrolysis cell, exiting the anode of the solid-oxide electrolysis cell. The hydrogen stream 112 may exit the cathode side of the solid-oxide electrolysis cell.

A conventional water shift process and a conventional water knockout process may be employed to alter the constituents of the product stream 110 such that product stream 110' contains a suitable ratio of hydrogen to carbon monoxide. The water shift process involves an inorganic chemical reaction in which water and carbon monoxide react to form carbon dioxide and hydrogen. The water shift process may be performed in reverse using a catalyst, such as a copper/silicon dioxide or copper/alumina, to convert carbon dioxide and hydrogen in the product stream 110 to carbon monoxide and water, forming the product stream 110' with an increased ratio of carbon monoxide and water. The product stream 110' as altered by processes such as the water shift process and the water knockout process may be combined with the hydrogen stream 112 to form syngas 140. By adapting the process 100, as will be described in further detail below, the ratio of hydrogen to carbon monoxide in the syngas 140 may be controlled. By way of non-limiting example, the process 100 may be configured such that the syngas includes a ratio of hydrogen to carbon monoxide in the range of 1.7:1 to 2.12:1.

Specifically, the ratio of hydrogen to carbon monoxide in the syngas 140 may be controlled using a variety of means. By way of non-limiting example, the thermochemical conversion process 106 is a gasification process or a combustion process, the oxygen stream 104 may be re-circulated to the thermochemical conversion process 106. In the gasification process, the recirculation of the oxygen stream may be altered to control the level of oxidation occurring during the gasification process so that the ratio of carbon dioxide to carbon monoxide in the product stream 110 may be controlled within a desired ratio. By controlling the ratio of carbon dioxide to carbon monoxide in the product stream 110, the ratio of hydrogen to carbon monoxide in the syngas 140 may ultimately be controlled.

The syngas 140 may be fed to an apparatus or reactor suitable for conducting a Fischer-Tropsch process 135 to convert the hydrogen and carbon monoxide in the syngas 140 to a synthetic liquid fuel, or synfuel 155. For example, to conduct the Fischer-Tropsch process 135, the syngas 140 may be discharged into a conventional Fischer-Tropsch reactor. In the Fischer-Tropsch reactor, the syngas 140 may be contacted with a catalyst to convert a portion of the syngas 140 into synfuel 155. The synfuel 155 may be readily captured and stored in a suitable container (not shown), such as a storage pile or storage tank. Alternatively, the syngas may be converted to methanol by way of a copper- or zinc-containing catalyst. Methanol may be used to form gasoline and olefins by conventional processing.

Figure 2:
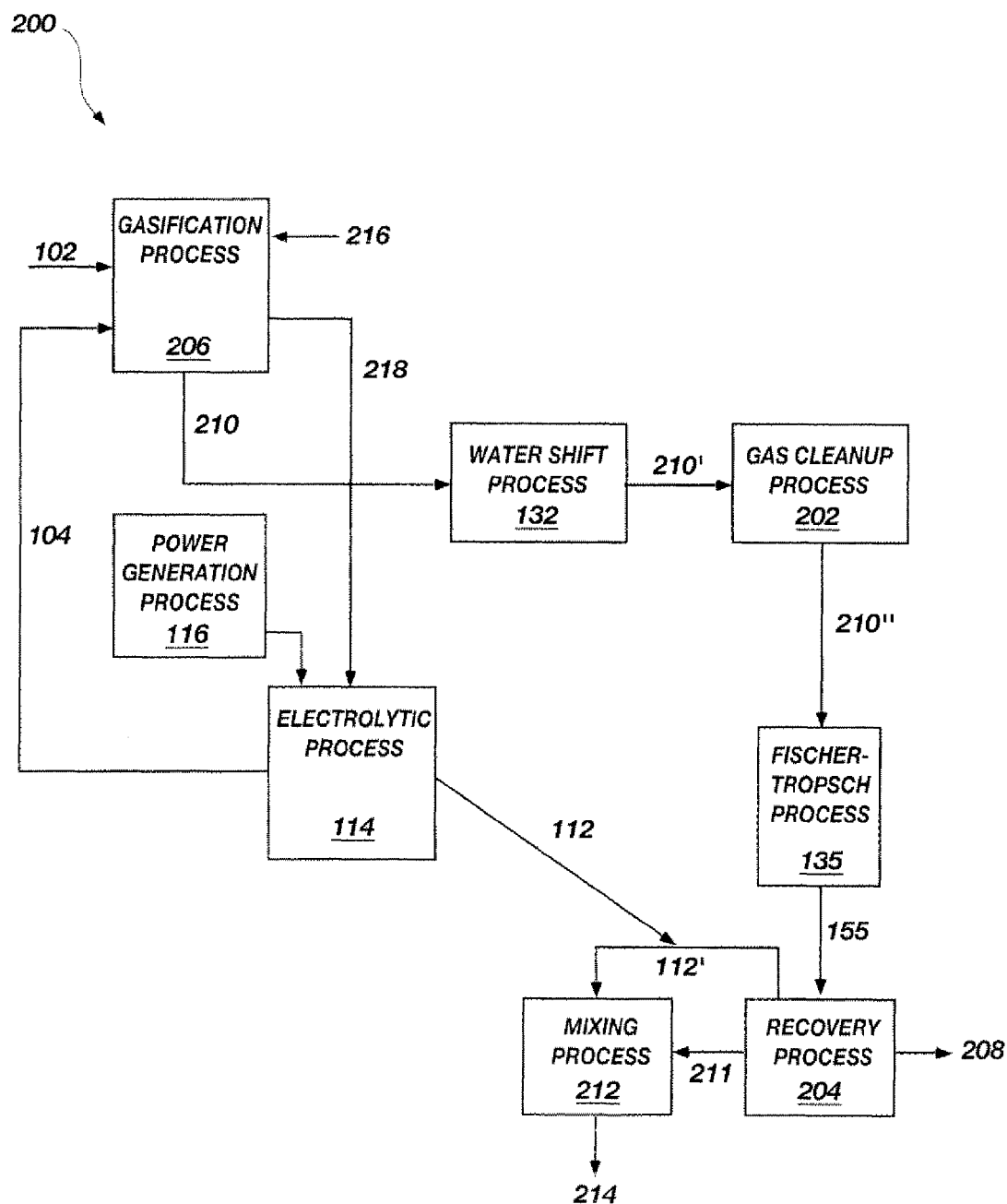

FIG. 2 is a simplified schematic of an embodiment of a hydrocarbon production process 200 that utilizes a gasification process 206 as the thermochemical conversion process 106. The hydrocarbon production process 200 may include sub-processes such as a gasification process 206, an electrolytic process 114, power generation process 116, a heat exchange process (not shown), a water shift process 132, a gas cleanup process 202, a recovery process 204, a Fischer-Tropsch process 135, and a mixing process 212. The sub-processes of the hydrocarbon production process 200 are illustrated as sub-process blocks in FIG. 2.

An input 102 including at least one carbonaceous fuel may be gasified to form a product stream 210 including a mixed gas and high-temperature steam 218 using the gasification process 206. The mixed gas of the product stream 210 may include, for example, water, hydrogen, carbon dioxide, and carbon monoxide as well as non-hydrocarbon contaminants. As used herein, the term "non-hydrocarbon contaminants" means and includes contaminants, such as hydrogen sulfide, carbon dioxide, nitrogen and water, which are typically produced by gasification of carbonaceous fuels.

A water supply 216 and an oxygen stream 104 may be used to facilitate the gasification process 206. The oxygen stream 104 may be re-circulated from within the hydrocarbon production process 200, as will be described below, or may be obtained from an air supply unit (not shown). The heat produced during the gasification process 206 may be used to heat water or steam, for example, in a quenching process (not shown) forming high-temperature steam 218. By way of non-limiting example, a radiant syngas cooler may be employed in the quenching process and may be internal or external to the gasifier. The high-temperature steam 218 exiting the quenching process may be electrolyzed to form an oxygen stream 104 and a hydrogen stream 112 by employing an electrolytic process 114. The oxygen stream 104 may be cycled to, and utilized in, the gasification process 206. Recirculation of the oxygen stream 104 to the gasification process 206 enables the amount of oxidation occurring during the gasification process 206 to be controlled and, thus enables the ratio of carbon dioxide to carbon monoxide to be controlled in the product stream 210.

Where the product stream 210 produced by the gasification of the input 102 has a hydrogen to carbon monoxide ratio too low for conversion to synfuels by a Fischer-Tropsch reaction, the water shift process 132 may be employed to convert carbon monoxide and water in the product stream 210 to carbon dioxide and hydrogen, forming product stream 210' with an increased ratio of hydrogen to carbon monoxide. For example, the hydrogen to carbon dioxide ratio in the product stream 210' may be about 2.12:1. A gas cleanup process 202 may be used to remove carbon dioxide and hydrogen sulfide from the product stream 210'.

After removal of carbon dioxide and hydrogen sulfide, product stream 210" may include carbon monoxide, hydrogen, water, and steam as well as non-hydrocarbon contaminants produced during the gasification process 206. The carbon monoxide and hydrogen in the product stream 210" may be converted to synfuel 155 using the Fischer-Tropsch process 135. The synfuel 155 may be fed to a recovery process 204 to separate light hydrocarbons 208, wax hydrocarbons 211 and hydrogen 112' from the synfuel 155 using, for example, a palladium alloy catalyst. As used herein, the term "light hydrocarbon" means and includes a hydrocarbon having a low molecular weight such as methane, ethane, propane and butane. The term "wax hydrocarbon," as used herein, means and includes a hydrocarbon such as naphthenic compounds (i.e., naphthenes, cycloparaffins or hydrogenated benzenes), paraffinic compounds and olefinic compounds typically having a molecular weight of greater than about 450 amu.

As a non-limiting example, the light hydrocarbons 208 removed from the synfuel 155 may be used in power generation. The hydrogen stream 112' removed during the recovery process 204 and the hydrogen stream 112 produced by the electrolytic process 114 may be combined with the wax hydrocarbons 211 using a mixing process 212 to form a liquid fuel 214. As used herein, the term "liquid fuel" means and includes liquid hydrocarbon compounds such as propanes, butanes, pentanes and heavier hydrocarbon products.

Figure 3:
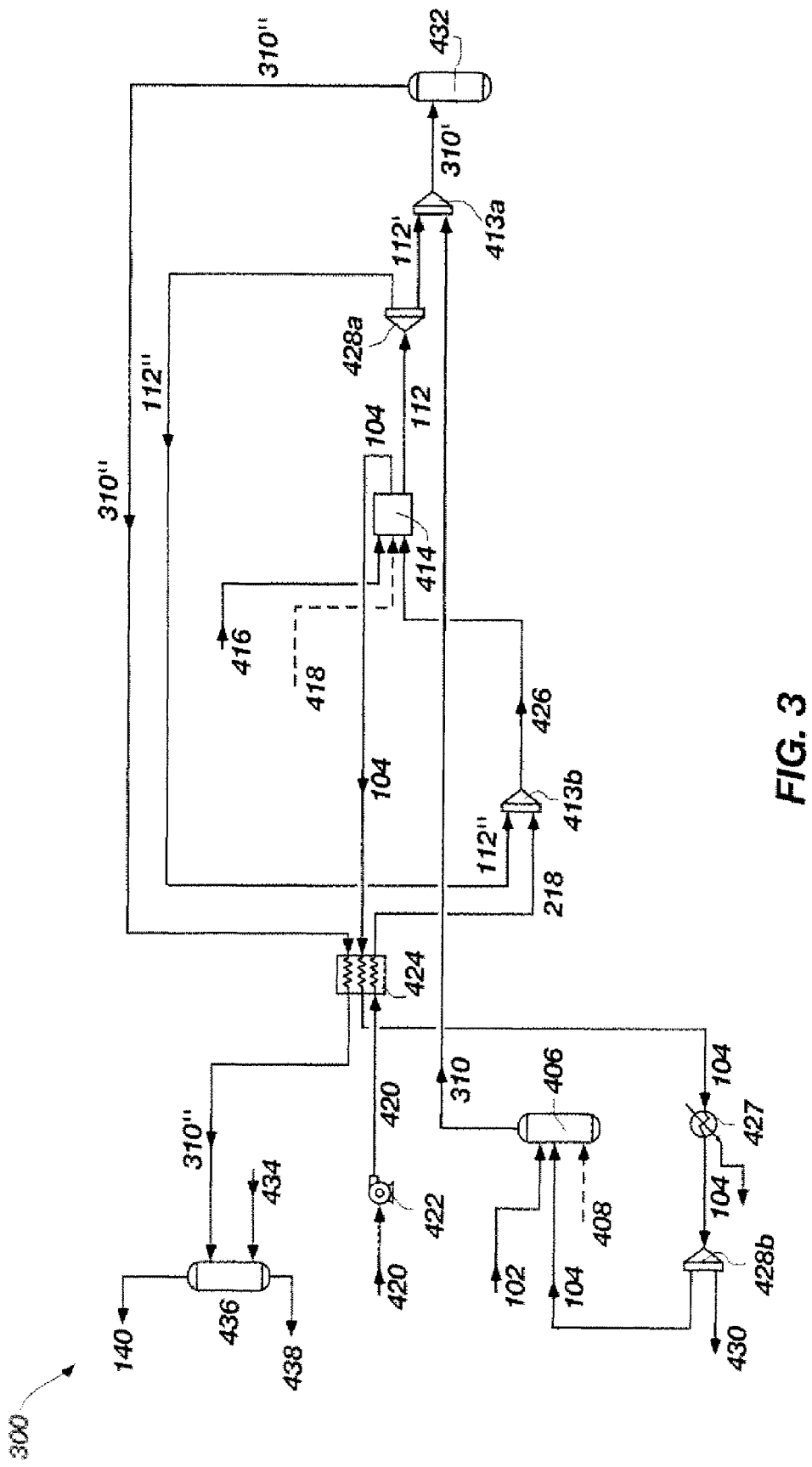
FIGS. 3-6 are schematic diagrams depicting various embodiments of systems for producing syngas, comprising feeding a carbonaceous fuel into a thermochemical conversion apparatus, feeding an oxygen stream to a thermochemical conversion apparatus, feeding the product stream of a thermochemical conversion apparatus to a quencher, and feeding the carbonaceous fuel to a pyrolyzer, respectively.

Referring to FIG. 3, a process diagram is shown for a syngas production system 300 in accordance with an embodiment of the invention. The process diagram includes a variety of flow paths associated with different acts of the process for syngas production as will be described in detail below. An input 102 including a carbonaceous fuel such as, for example, a biomass source, may be fed into a thermochemical conversion apparatus 406, such as a gasifier, a pyrolyzer or a combustor. As a non-limiting example, the carbonaceous fuel may be cellulose. Solid carbonaceous fuel may be pulverized to facilitate transport into the thermochemical conversion apparatus 406. In some embodiments, process heat 408 may be used to facilitate the gasification of the carbonaceous fuel in the input 102.

In some embodiments, a gasifier may be employed as the thermochemical conversion apparatus 406 and the input 102 may be fed into the gasifier with an oxygen stream 104 to produce a desired ratio of carbon monoxide to carbon dioxide in a product stream 310. The oxygen stream 104 may be produced and recycled from within the syngas production system 300 as will be described in detail below. In embodiments using a gasifier as the thermochemical conversion apparatus 406, the oxygen stream 104 injected into the gasifier may be controlled to produce a desired ratio of carbon monoxide to carbon dioxide in the product stream 310. In embodiments using a pyrolyzer as the thermochemical conversion apparatus 406, the oxygen stream 104 may not be utilized. Thermochemical conversion of the carbonaceous fuel in the input 102, optionally in the presence of oxygen, creates the product stream 310 that may include, for example, water, hydrogen, carbon dioxide, and carbon monoxide, as well as other constituents or components as will be appreciated by those of ordinary skill in the art. As a non-limiting example, the product stream 310 may include from about 18% by volume to about 38% by volume water, from about 8% by volume to about 28% by volume hydrogen, from about 8% by volume to about 28% by volume carbon dioxide, and from about 27% by volume to about 47% by volume carbon monoxide. The product stream 310 may exit the thermochemical conversion apparatus 406 at a temperature in a range of from about 1300° C. to about 1450° C.

The product stream 310 may be directed to and mixed with a portion 112' of a hydrogen stream 112 by way of a mixing valve 413a, or other suitable piping configuration or device, to form a product stream 310'. The portion 112' of the hydrogen stream 112 may be directed from a valve 428a after being produced by decomposition of steam 218 using a solid-oxide electrolysis cell array 414, which may include one or more solid-oxide electrolysis cells, as described in detail below.

A water stream 420 may be pumped into the syngas production system 300 using an apparatus such as a water pump 422. Upon entering the syngas production system 300, the water stream 420 may have a temperature in the range of from about 11° C. to about 31° C. As a non-limiting example, the water pump 422 may be operated using energy obtained from a renewable source, such as nuclear power, hydro power or wind power. The water stream 420 may be pumped into a heat exchanger, such as a recuperator 424, or any other device known in the art for exchanging heat between gas and fluid streams. The heat from the recuperator 424 may vaporize at least part of the water stream 420 to form high-temperature steam 218. Because the heat in the mixed gas produced by the thermochemical conversion apparatus 406 is used to vaporize water for electrolysis, the syngas production system 300 may not be dependent and, thus may not be located within the vicinity of, an external heat source (not shown).

After exiting the recuperator 424, the high-temperature steam 218 may have a temperature in the range of from about 770° C. to about 980° C. The high-temperature steam 218 formed by passing the water stream 420 through the recuperator 424 may be fed through another valve 413b and combined with another portion 112" of the hydrogen stream 112 to form a feed stream 426 that includes steam and hydrogen. The feed stream 426 may include less than or equal to about 5% by volume water and greater than or equal to about 95% by volume hydrogen and may have a temperature in a range of from about 681° C. to about 881° C.

The feed stream 426 may be fed into the solid-oxide electrolysis cell array 414. Solid-oxide electrolysis cells in the solid-oxide electrolysis cell array 414 may be employed to decompose steam in the feed stream 426 to form a hydrogen stream 112 and an oxygen stream 104. A power source 416, such as a conventional renewable power source, may be used to provide an electrical current to the solid-oxide electrolysis cell array 414. For example, the power source 416 may provide an electrical current to the solid-oxide electrolysis cell array 414. Additionally, a heat source 418 may be provided to the solid-oxide electrolysis cell array 414 as necessary to support electrolysis of the steam. The heat source 418 may originate from the thermochemical conversion apparatus 406.

The oxygen stream 104 may be directed to and cooled by the recuperator 424, and additionally, may further be cooled by an ambient cooler 427. For example, the oxygen stream 104 may be cooled to a temperature of from about 17° C. to about 27° C. The cooled oxygen stream 104 may be split using another valve 428b or any other apparatus suitable for splitting the oxygen stream 104, such that a desired amount of the oxygen stream 104 is cycled to and fed into the thermochemical conversion apparatus 406 to control the amount of oxidation and the remaining excess oxygen 430 is discharged from the syngas production system 300. By controlling the amount of oxidation occurring during the thermochemical conversion of the carbonaceous fuel, the ratio of carbon dioxide to carbon monoxide may be advantageously controlled.

The hydrogen stream 112 produced by the solid-oxide electrolysis cell array 414 may additionally include water or steam and may be directed to valve 428a, or any other suitable device suitable for splitting the hydrogen stream 112, such that a portion 112' of hydrogen stream 112 may be fed into the mixing valve 413a and combined with the product stream 310 to form a product stream 310' including an increased amount of hydrogen and steam. Another portion 112" of the hydrogen stream 112 may be fed into another mixing valve 413b to be combined with high-temperature steam 218 directed from the recuperator 424 to form the feed stream 426. The product stream 310' may include from about 5% to about 25% by volume water, from about 46% to about 66% by volume hydrogen, from about 0.01% to about 5% by volume carbon dioxide, and from about 9% to about 20% by volume carbon monoxide. The product stream 310' may have a temperature in a range of from about 1050° C. to about 1165° C.

The product stream 310' may be fed into a conventional water shift reactor 432 that may include, for example, a copper- or iron-based catalyst. The water shift reactor 432 may convert carbon dioxide and hydrogen in the product stream 310' to carbon monoxide and water, resulting in a product stream 310" having substantially increased amounts of carbon monoxide and water. As a non-limiting example, the product stream 310" may include hydrogen and carbon dioxide in a ratio of about 2.12:1. Upon exiting the water shift reactor 432, a product stream 310" may include from about 10% to about 30% by volume water, from about 41% to about 61% by volume hydrogen, from about 0.01% to about 14% by volume carbon dioxide, and from about 14% to about 34% by volume carbon monoxide. The product stream 310" may have a temperature in the range of from about 1023° C. to about 1123° C.

The product stream 310" may be passed though and cooled by the recuperator 424, thus retaining process heat created during gasification of the carbonaceous fuel in the input 102. As such, the process heat in the product stream 310" produced during the thermochemical conversion of the carbonaceous fuel may be transferred to form high-temperature steam 218 and, thus, is used to support the formation of hydrogen and oxygen by the solid-oxide electrolysis cell array 414. After cooling by the recuperator 424, the product stream 310" may be flowed to a separation tank, such as a conventional water knockout tank 436 or any other device configured to remove water from the product stream 310". By removing excess water 438 from the product stream 310", a syngas 140 is formed that is substantially free of water. The syngas 140 may include, for example, hydrogen and carbon monoxide. By way of non-limiting example, the syngas 140 may include less than about 5% water, from about 54% to about 74% hydrogen, less than about 16% carbon dioxide, and from about 20% to about 40% carbon monoxide. Conventional ambient cooling 434 may be used to facilitate removal of water 438 by the water knockout tank 436.

Figure 4:
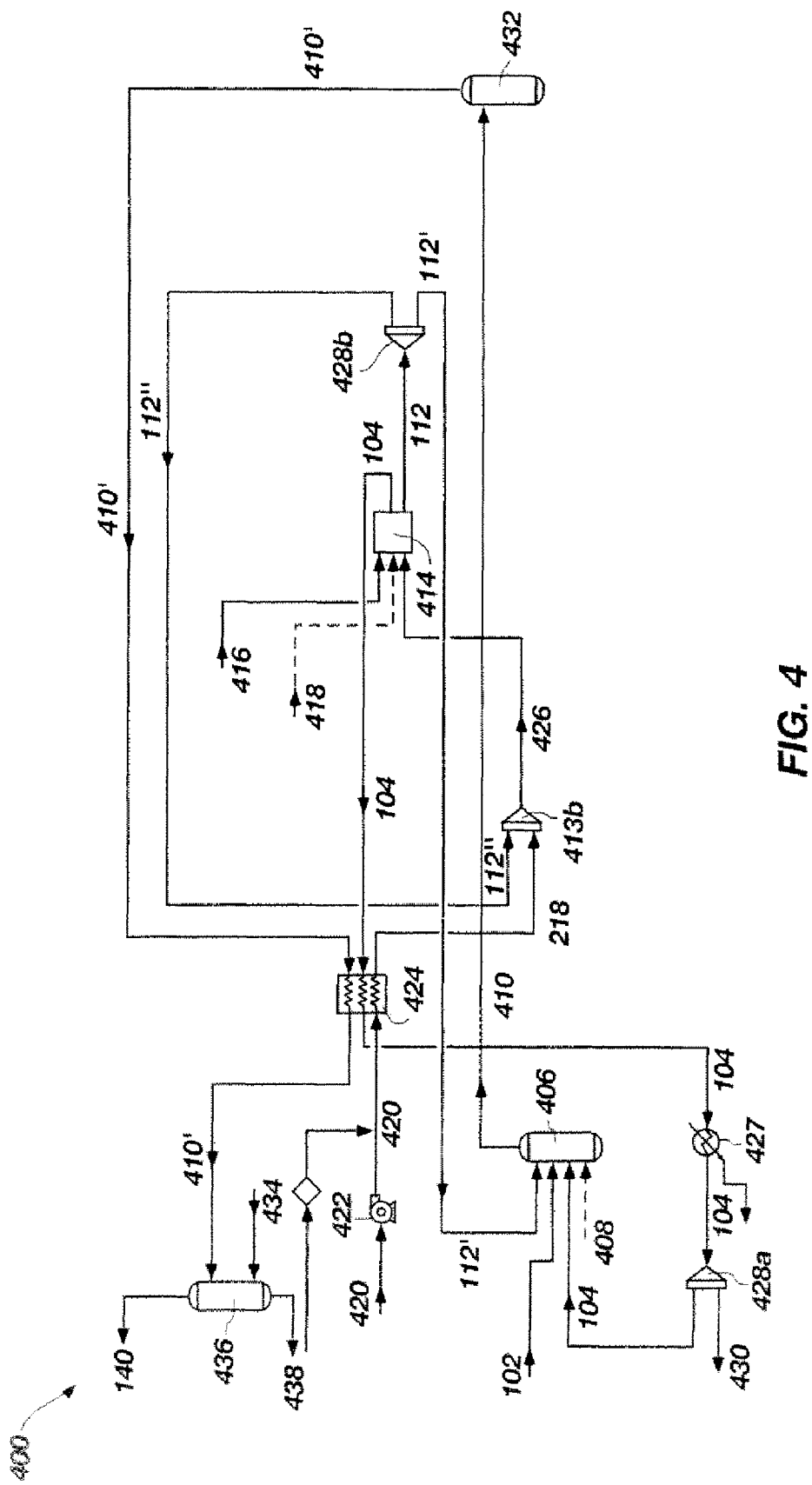

Referring to FIG. 4, a process diagram is shown for a syngas production system 400 in accordance with an embodiment of the invention. The syngas production system 400 includes a variety of flow paths associated with different acts of the process, as will be described in detail below. An input 102 including a carbonaceous fuel such as, for example, a biomass source, may be fed into a thermochemical conversion apparatus 406. By way of non-limiting example, the thermochemical conversion apparatus 406 may be a gasifier, a combustor or a pyrolyzer. In embodiments employing a gasifier or a combustor as the thermochemical conversion apparatus 406, the thermochemical conversion apparatus 406 may be supplied with an oxygen stream 104 and a portion 112' of the hydrogen stream 112. Optionally, the thermochemical conversion apparatus 406 may be operated in the presence of process heat 408 to gasify the carbonaceous fuel in the input 102. As a non-limiting example, the input 102 may include pulverized cellulose.

The input 102 may be fed into the thermochemical conversion apparatus 406 with an oxygen stream 104 and portion 112' of the hydrogen stream 112. The oxygen stream 104 and the portion 112' of the hydrogen stream 112 may be produced and recycled from within the syngas production system 400, as will be described in greater detail below. Thermochemical conversion of the carbonaceous fuel in the presence of the oxygen stream 104 and the portion 112' of the hydrogen stream 112, creates a product stream 410 that may include, for example, water, hydrogen, carbon dioxide, carbon monoxide, and methane, as well as other constituents or components as will be appreciated by those of ordinary skill in the art. The product stream 410 may include from about 12% to about 32% by volume water, from about 40% to about 60% by volume hydrogen, less than about 5% by volume carbon dioxide, from about 14% to about 34% by volume carbon monoxide, and less than about 1% by volume methane. By way of non-limiting example, the product stream 410 may have a temperature in a range of from about 1321° C. to about 1421° C.

The product stream 410 may be fed into a conventional water shift reactor 432 wherein carbon dioxide and hydrogen in the product stream 410 are converted to carbon monoxide and water. Thus, the product stream 410' exiting the water shift reactor 432 may have a substantially increased amount of carbon monoxide and water. As a non-limiting example, the product stream 410' may have a temperature in a range of from about 1321° C. to about 1421° C. and may include from about 12% to about 32% by volume water, from about 41% to about 61% by volume hydrogen, from about 0.01% to about 8% by volume carbon dioxide, from about 14% to about 34% by volume carbon monoxide, and less than about 0.01% by volume methane.

The product stream 410' may be passed through a heat exchanger, such as recuperator 424 or any other device known in the art for exchanging heat between gas and fluid streams, such that the product stream 410' is substantially cooled and heat generated during the thermochemical conversion of the carbonaceous fuel is recovered. For example, after passing through the recuperator 424, the product stream 410' may have a temperature in a range of from about 409° C. to about 509° C. The cooled product stream 410' may be flowed to a separation tank, such as a conventional water knockout tank 436, or any other device capable of removing excess water 438 from the product stream 410'. The water knockout tank 436 removes excess water 438 from the product stream 410', forming a syngas 140 that is substantially free of water. The syngas 140 may include, for example, less than about 5% water, from about 55% to about 75% hydrogen, less than about 8% carbon dioxide, from about 21% to about 41% carbon monoxide, and less than about 5% methane. A Fischer-Tropsch process (not shown) may be used to convert the syngas 140 to synfuel which may be used a fuel or stored in a suitable container. Additionally, a catalytic process may be used to convert the syngas 140 into methanol, which may be used in the formation of hydrocarbon products, such as gasoline.

A water stream 420 may be pumped into the syngas production system 400 using an apparatus such as a water pump 422. As a non-limiting example, the water stream 420 may enter at a temperature in a range of from about 11° C. to about 31° C. The water stream 420 may be pumped into the recuperator 424, where heat from the gasification process has been captured and vaporizes the water stream 420 to form high-temperature steam 218. The high-temperature steam 218 exiting the recuperator 424 may have a temperature in a range of from about 780° C. to about 880° C. By transferring heat from the product stream 410' to the water stream 420 to form high-temperature steam 218, heat produced during thermochemical conversion of the carbonaceous fuel is used to support the decomposition of water by the solid-oxide electrolysis array 414. Therefore, the syngas production system 400 is not dependent on an external heat source. Because the syngas production system 400 does not need to be co-localized with the external heat source, the syngas production system 400 provides advantages over conventional syngas production.

The high-temperature steam 218 formed by the recuperator 424 may be fed into a mixing valve 413a and combined with another portion 112" of the hydrogen stream 112 to obtain a feed stream 426 that may include steam and hydrogen, among other components. By way of non-limiting example, the feed stream 426 may include less than or equal to about 5% by volume water and greater than or equal to about 95% by volume hydrogen and may have a temperature in a range of from about 777° C. to about 877° C. The feed stream 426 may be fed into and decomposed by the solid-oxide electrolysis cell array 414 to form a hydrogen stream 112 and an oxygen stream 104. A power source 416 may be used to provide an electrical current to the solid-oxide electrolysis cell array 414. For example, the power source 416 may provide an electrical current in a range of from about 2554 kW to about 2624 kW. Additionally, process heat 418 may be provided to the solid-oxide electrolysis cell array 414 as needed to support electrolysis of the high-temperature steam 218. Heat produced by the thermochemical conversion apparatus 406 during gasification, combustion or pyrolyzation of the carbonaceous fuel may, optionally, be used as the process heat 418.

The oxygen stream 104 produced by the solid-oxide electrolysis cell array 414 may be directed to and cooled by the recuperator 424. The temperature of the oxygen steam 104 after cooling by the recuperator 424 may be in a range of from about 27° C. to about 137° C. Additionally, the oxygen stream 104 may be further cooled to a temperature in a range of from about 5° C. to about 70° C. using a conventional ambient cooler 427. Once cooled, the oxygen stream 104 may be split using a valve 428a, or any other device configured to split the oxygen stream 104, such that a desired amount of oxygen is cycled to and fed into the thermochemical conversion apparatus 406 and the remaining excess cooled oxygen 430 may be expelled from the system 400. The desired amount of oxygen may be fed into the thermochemical conversion apparatus 406 to control the amount of oxidation occurring therein so that the ratio of carbon dioxide to carbon monoxide may be altered.

The hydrogen stream 112 produced by the solid-oxide electrolysis cell array 414 may be directed to another valve 428b, or any other suitable device such that a portion 112' of the hydrogen stream 112 may be recycled and injected into the thermochemical conversion apparatus 406 and another portion 112" of the hydrogen stream 112 mixed with high-temperature steam 218 by way of a mixing valve 413a to form the feed stream 426.

Figure 5:
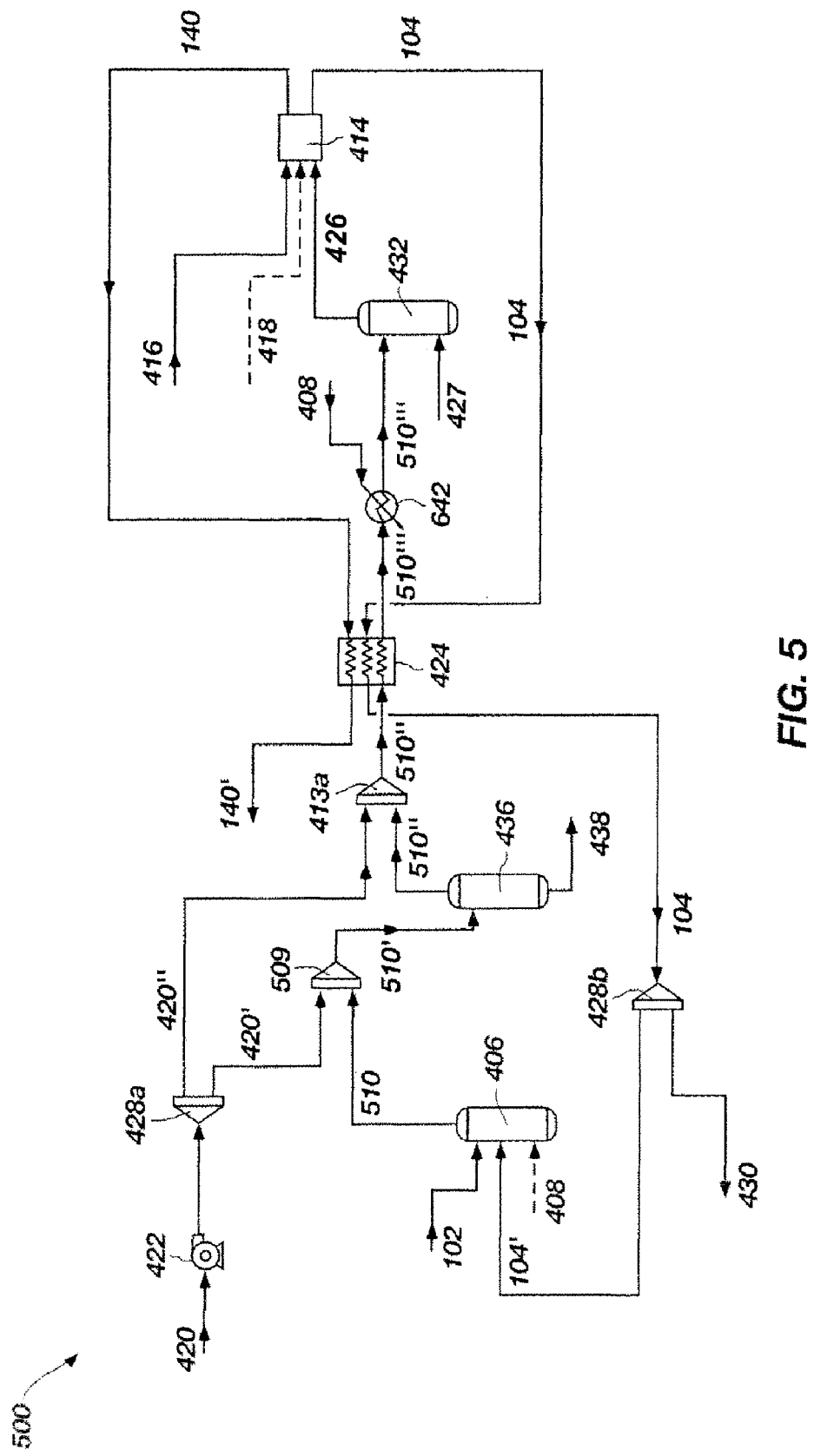

Referring to FIG. 5, a process diagram is shown for a syngas production system 500 in accordance with another embodiment of the present invention. The syngas production system 500 includes a variety of flow paths associated with different acts of the process as will be described in detail below. An input 102 including a carbonaceous fuel may be fed into a thermochemical conversion apparatus 406, such as a gasifier, a combustor or a pyrolyzer. In embodiments employing a combustor or gasifier as the thermochemical conversion apparatus 406, the input 102 may be introduced with an oxygen stream 104'. The carbonaceous fuel may be, as a non-limiting example, a biomass source, such as cellulose. Thermochemical conversion of the carbonaceous fuel in the input 102, optionally in the presence of oxygen, creates a product stream 510 that may include, for example, water, hydrogen, carbon dioxide, carbon monoxide, and methane as well as other constituents or components as will be appreciated by those of ordinary skill in the art. By way of non-limiting example, the product stream 510 may have a temperature in a range of from about 1050° C. to about 1165° C. and may include from about 18% to about 38% by volume water, from about 8% to about 28% by volume hydrogen, from about 8% to about 28% by volume carbon dioxide, and from about 27% to about 47% by volume carbon monoxide.

The product stream 510 may be cooled by directing the product stream 510 and a portion 420' of a water stream 420 into a quencher 509. By way of non-limiting example, the water stream 420 may be introduced into the syngas production system 500 using a water pump 422 and may be split using, for example, a valve 428a or other suitable device, such that a portion 420' of the water stream 420 may be directed to the quencher 509 and another portion 420" of the water stream 420 may be directed to a mixing valve 413a. The portion 420' of the water stream 420 may be introduced to the quencher 509 at a substantially lower temperature than that of the product stream 510. For example, the portion 420' of the water stream 420 may be introduced into the quencher at a temperature in a range of from about 5° C. to about 71.5° C. The quenching process may form a product stream 510' including, as a non-limiting example, from about 86% to about 98% by volume water and less than about 5% by volume of each of hydrogen, carbon dioxide, and carbon monoxide. The quencher 509 may be used to cool the product stream 510 to a temperature at or near the saturation level such that water in the product stream 510 is present in a liquid phase.

The cooled product stream 510' may be directed to a separation tank, such as a water knockout tank 436, to remove excess water 438 formed as a byproduct of thermochemical conversion of the carbonaceous fuel or incorporated during the quenching process. Removal of water from the product stream 510' may form a product stream 510" that includes, by way of non-limiting example, less than about 5% by volume water, from about 15% to about 35% by volume hydrogen, from about 12% to about 32% by volume carbon dioxide, and from about 42% to about 62% by volume carbon monoxide.

After removal of excess water 438, the product stream 510" may be combined with another portion 420" of the water stream 420 using the mixing valve 413a, or other suitable device. Thus, a product stream 510'" exiting the mixing valve 413a includes an increased amount of water. As a non-limiting example, the product stream 510'" may exhibit a temperature in a range of from about 4.8° C. to about 84.8° C. and may include from about 47% to about 67% by volume water, from about 1% to about 21% by volume hydrogen, from about 0.01% to about 11% by volume carbon dioxide, and from about 13% to about 33% by volume carbon monoxide.

The product stream 510'" may be directed from the mixing valve 413a to a heat exchanger, such as recuperator 424, to increase the temperature of the product stream 510'" such that water therein is converted to high-temperature steam. By way of non-limiting example, after passing through the recuperator 424, the product stream 510'" may have a temperature in a range of from about 174° C. to about 274° C. Additionally, the product stream 510'" may be passed through a heater 642 to further heat the components thereof and to convert water that may still be present therein to high-temperature steam. The heater 642 may utilize process heat produced by the thermochemical conversion of the carbonaceous fuel in the input 102 to increase the temperature of the product stream 510'". By passing the product stream 510''' through the recuperator 424 and, optionally, the heater 642, the syngas production system 500 is configured to enable the heat from the product stream 510 produced by the thermochemical conversion apparatus 406 utilized in the electrolysis of steam of the co-electrolysis of steam and carbon dioxide. In this way, the syngas production system 500 is configured to produce syngas in the absence of an external heat source.

After passing through the recuperator 424 and, optionally, the heater 642, the components of the product stream 510''' have a temperature sufficient to enable high temperature co-electrolysis of steam and carbon dioxide. For example, the product stream 510''' may have a temperature in a range of from about 676.5° C. to about 776.5° C.

Prior to co-electrolysis, the product stream 510''' may be directed to a water shift reactor 432 that may employ a conventional ambient cooler 427 to convert water and carbon monoxide in the product stream 510''' to hydrogen and carbon dioxide, forming a feed stream 426. The feed stream 426 may include from about 36% to about 56% by volume water, from about 12% to about 32% by volume hydrogen, from about 11% to about 31% by volume carbon dioxide, and from about 1% to about 21% by volume carbon monoxide.

The feed stream 426 may be directed to the solid-oxide electrolysis cell array 414, including one or more solid-oxide electrolysis cells operably coupled to a power source 416 and, optionally, a process heat 418. The solid-oxide electrolysis cell array 414 may be used to simultaneously decompose water into hydrogen and oxygen and carbon dioxide into carbon monoxide and oxygen. In other words, the water and carbon dioxide may be subjected to co-electrolysis to form an oxygen stream 104 and a syngas 140. As a non-limiting example, the syngas 140 may include less than about 5% by volume water, from about 58% to about 78% by volume hydrogen, less than about 5% by volume carbon dioxide, and from about 22% to about 42% by volume carbon monoxide.

The oxygen stream 104 produced by co-electrolysis of water and carbon dioxide may be passed through a gas cleanup (not shown) that facilitates removal of pollutants such as sulfides and remaining carbon dioxide. The oxygen stream 104 may have a temperature in a range of from about 754° C. to about 854° C. upon exiting the solid-oxide electrolysis cell array 414. The oxygen stream 104 may also be fed through and cooled by the recuperator 424, the retained heat from which may be employed in heating the product stream 510''', as previously described. Subsequent to cooling, the oxygen stream 104 may have a temperature in a range of from about 7° C. to about 107° C. The oxygen stream 104 may be directed to the another valve 428b such that excess oxygen 430 may be discharged from the syngas production system 500 and the remaining oxygen stream 104' may be fed into the thermochemical conversion apparatus 406. For example, the thermochemical conversion apparatus 406 may be a gasifier and the amount of oxygen fed into the reaction may be controlled to obtain a desired ratio of carbon dioxide to carbon monoxide in the product stream 510.

Figure 6:
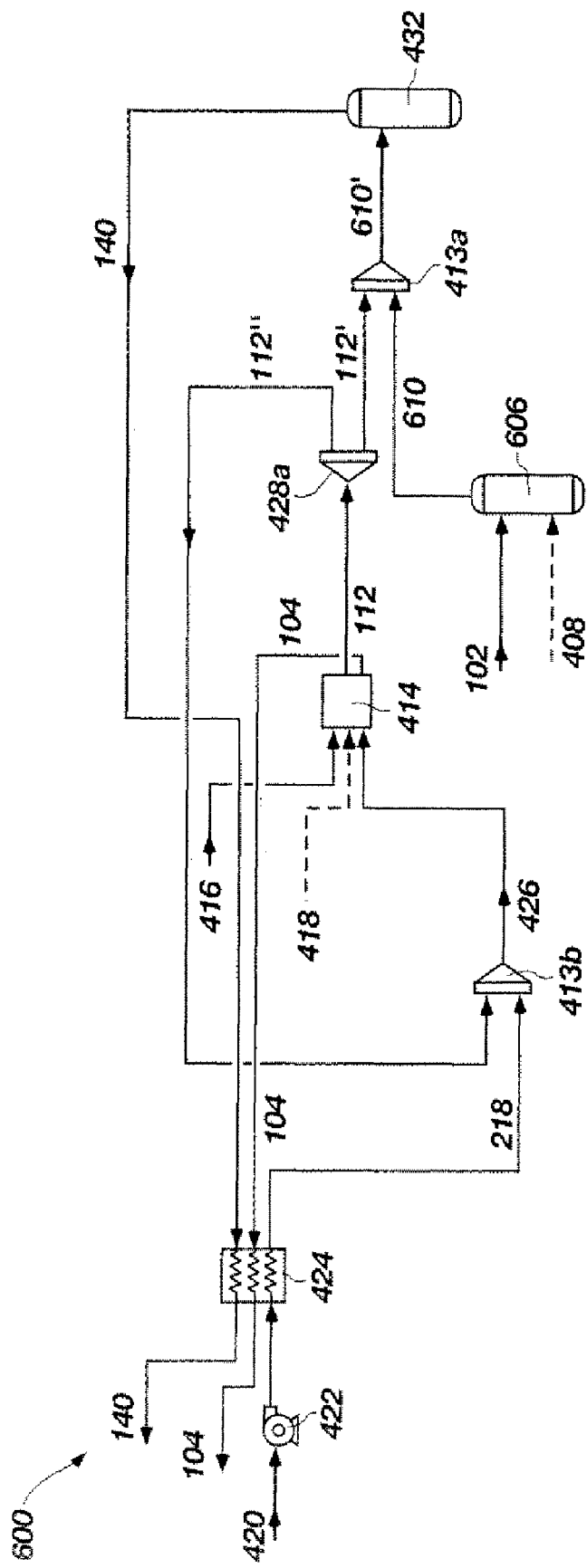

As illustrated in FIG. 6, a syngas production system 600 may be configured to include a pyrolyzer 606 to convert an input 102, including a carbonaceous fuel, into a product stream 610, including a mixed gas. The pyrolyzer 606 may be used to pyrolyze the carbonaceous fuel in the absence of oxygen. Process heat 408 may, optionally, be used to support the pyrolysis of the carbonaceous fuel in the input 102. The product stream 610 may include, for example, water, hydrogen, carbon dioxide, carbon monoxide, and methane. By way of non-limiting example, the product stream 610 exiting the pyrolyzer 606 may exhibit a temperature in a range of from about 527° C. to about 627° C. and may include less than 5% by volume water, from about 20.5% to about 40.5% by volume hydrogen, less than about 5% by volume carbon dioxide, from about 45% to about 65% by volume carbon monoxide, and from about 3% to about 23% by volume methane.

The product stream 610 may be directed from the pyrolyzer 606 to a mixing valve 413a, or other suitable device, such that the product stream 610 may be mixed with a portion 112' of a hydrogen stream 112. The hydrogen stream 112 may include hydrogen and steam and may be obtained from high temperature electrolysis of water, as will be described in detail below. As a non-limiting example, the hydrogen stream 112 may be formed using solid-oxide electrolysis cell array 414, which includes one or more solid-oxide electrolysis cells, connected to a power source 416, each of which electrolyze water to form hydrogen and oxygen gas. Specifically, a water stream 420 may be converted to high-temperature steam 218 via a counter-flow heat exchanger, such as a recuperator 424, or any other device known in the art for exchanging heat between gas and fluid streams. The water stream 420 may be, as an example, directed to the recuperator 424 using a water pump 422 operated using a renewable power source (not shown). Before being passed to the solid-oxide electrolysis cell array 414, the high-temperature steam 218 may be mixed with another portion 112'' of the hydrogen stream 112 cycled from the solid-oxide electrolysis cell array 414 using, for example, another mixing valve 413b, or other similar piping arrangement to form a feed stream 426. The feed stream 426 may include, for example, steam and hydrogen and may be fed to the solid-oxide electrolysis cell array 414 such that steam may be decomposed to form the hydrogen stream 112 and the oxygen stream 104. As a non-limiting example, the feed stream 426 may have a temperature in a range of from about 777° C. to about 877° C. and may include greater than or equal to about 85% water and less than or equal to about 15% hydrogen. Optionally, a heat source 418 may be connected to the one or more solid-oxide electrolysis cell array 414 to facilitate electrolysis of high-temperature steam 218.

The oxygen stream 104 may be directed through and cooled by the recuperator 424 before being expelled from the syngas production system 600. The hydrogen stream 112 may be, for example, directed to a valve 428a that splits the hydrogen stream 112, directing a portion 112' of the hydrogen stream 112 to the mixing valve 413a to be combined with the product stream 610 and directing another portion 112'' to another mixing valve 413b to be mixed with high-temperature steam 218.

After combining the product stream 610 with the portion 112' of the hydrogen stream 112, the product stream 610' contains an increased ratio of hydrogen gas. By way of non-limiting example, the product stream 610' may include less than about 1% water, from about 53% to about 73% hydrogen, less than about 1% carbon dioxide, from about 18% to about 38% carbon monoxide, and less than about 5% methane. The product stream 610' may be fed into a water shift reactor 432 that converts carbon dioxide and hydrogen to carbon monoxide and water, thus altering the ratio of constituents in the product stream 610' to form a syngas 140. By way of non-limiting example, the syngas 140 exiting the water shift reactor 432 may exhibit a temperature in a range of from about 1030° C. to about 1130° C. and may include less than 1% by volume water, from about 53% to about 73% by volume hydrogen, less than about 1% by volume carbon dioxide, from about 18% to about 38% by volume carbon monoxide, and less than about 5% by volume methane.

The syngas 140 may be passed through and cooled by the recuperator 424 before to being directed to a Fischer-Tropsch process (not shown) which may convert the syngas 140 to a synfuel or any other conventional catalytic process used to form hydrocarbon products. For example, the syngas 140 may have a temperature in a range of from about 209° C. to about 309° C. after exiting the recuperator 424. By cooling the syngas 140, the recuperator 424 retains heat produced during a thermochemical conversion of the carbonaceous fuel in the input 102. As previously discussed, the heat from the syngas 140 is transferred to water to create high-temperature steam that may be electrolyzed without applying heat from another, external source. By utilizing heat produced within the syngas production system 600 to perform electrolysis, the syngas production system 600 is not dependent on, and may not be located near, an external heat source. By utilizing heat from pyrolysis of at least one type of carbonaceous fuel to convert the water stream 420 to high-temperature steam that may be electrolyzed by the solid-oxide electrolysis array 414, the reliance on an outside heat source is substantially reduced. Conventionally, a high-temperature power plant, such as a nuclear power plant, may be used to produce hydrogen for syngas. Because hydrogen is highly flammable, storage, production and use of hydrogen near a nuclear power plant may be problematic. In the syngas production system 600, the pyrolyzer 606 may be located near the solid-oxide electrolysis cell array 414 thus, eliminating problems associated with the production, storage and use of hydrogen near a nuclear power plant.

The following examples serve to explain embodiments of the invention in more detail. These examples are not to be construed as being exhaustive or exclusive as to the scope of this invention.

EXAMPLES

The five examples set forth below provide non-limiting examples of systems having the ability to utilize heat generated from the combustion, gasification or pyrolyzation of a carbonaceous fuel to support the electrolysis of water or the co-electrolysis of water and carbon dioxide. The modeling software UNISIM, which is commercially available from Honeywell International, Inc. (Morristown, N.J.), was used to model the processes of each of the examples. In each of the examples, the feed stream includes cellulose. The so-called "syngas production efficiency" for each of the systems was calculated using the following equation: $[(HHV_{syngas}) \times (\text{flowrate of syngas})]/[(HHV_{cellulose}) \times (\text{flowrate of cellulose}) + (\text{electrical power (watts)}/0.30)]$, wherein the HHV is the higher heating value (i.e., the heat released from cellulose during combustion). The syngas production efficiency provides a means of comparing the electrical energy fed into the solid-oxide electrolysis cell array per unit of syngas output for the syngas production process discussed in Examples 1 through 5 with one another.

Example 1

High-Temperature Co-Electrolysis with Gasifier and Cleanup

Modeling was conducted for a syngas production process 300 using a gasifier as the thermochemical conversion apparatus 406. As previously noted, the syngas production system 300 utilized heat produced by gasification of a carbonaceous fuel to support high temperature electrolysis using a solid-oxide electrolysis cell array 414. Specifically, the heat generated during the gasification of a carbonaceous fuel was harnessed and transferred to the feed stream 426 using the recuperator 424.

Referring back to FIG. 3, conditions or "state points" of fluid flowing throughout the syngas production system 300 are now described. The input 102 including cellulose as the carbonaceous fuel entered the syngas production system 300 at a pressure of about 2758 kPa, at a temperature of about 21.15° C. and at a mass flow rate of about 583.7 kilograms per hour (kg/h).

Gasification of the input 102 provided a product stream 310 including a mole fraction composition of about 0.277 water, about 0.1776 hydrogen, about 0.1776 carbon dioxide and about 0.3679 carbon monoxide. At a location between a gasifier, which was employed as the thermochemical conversion apparatus 406, and the mixing valve 413a, the product stream 310 exhibited a temperature of about 1370.85° C. and a pressure of about 2758 kPa. The product stream 310 was mixed with the portion 112' of the hydrogen stream 112 such that the product stream 310' included a mole fraction composition of about 0.1533 water, about 0.5592 hydrogen, about 0.0936 carbon dioxide, and about 0.1939 carbon monoxide and was fed to a water shift reactor 432 at a pressure of about 2758 kPa, a temperature of about 1115° C., and a mass flow of about 1010 kg/h.

After exiting the water shift reactor 432 and prior to passing through the recuperator 424, the product stream 310" exhibited a temperature of about 1072.85° C. and a pressure of about 2758 kPa. As previously described, the recuperator 424 caused a reduction in temperature of the product stream 310". As such, the product stream 310" exhibited a temperature of about 176° C. and a pressure of about 2758 kPa after passing though the recuperator 424. The product stream 310" was passed through the water knockout tank 436 to remove excess water 438. The syngas 140 exiting the water knockout tank 436 includes a mole fraction composition of about 0.0013 water, about 0.6397 hydrogen, about 0.0577 carbon dioxide, and about 0.3012 carbon monoxide and exhibited a temperature of about 25° C. and a pressure of about 2758 kPa and had a mass flow of about 739.3 kg/h. Table 1 provides a summary of the syngas 140 constituents as well as efficiency data for syngas production using the syngas production system 300.

TABLE 1

| Hydrogen:Carbon Monoxide Ratio | 2.124:1 |
| Syngas Production Efficiency | 42.43% |
| gmol Syngas/(gmol Cellulose * Watt (electric)) | 7.036 |

Prior to passing though the recuperator 424, the water stream 420 exhibited a temperature of about 21° C., a pressure of about 101.3 kPa and a mass flow of about 640.2 kg/h. After exiting the recuperator 424, the temperature of the high-temperature steam 218 was about 831° C. At a location between the another mixing valve 413b and the solid-oxide electrolysis cell array 414, the feed stream 426 included a mole fraction composition of about 0.95 steam and about 0.05 hydrogen and exhibited a temperature of approximately 827° C.

An electrical current of 2362 kW was supplied to the solid-oxide electrolysis cell array 414 using a remotely located power source. The solid-oxide electrolysis cell array 414 included $6.0 \times 10^4$ solid-oxide electrolysis cells, each solid-oxide electrolysis cell having an area of 225.0 cm$^2$ and a current density of 0.1389 amperes/cm$^2$. The hydrogen stream 112 exiting the solid-oxide electrolysis cells 414 included a mole fraction composition of about 0.0155 water and about 0.9845 hydrogen and exhibited a temperature of about 731° C. and a pressure of about 2758 kPa and had a mass flow of about 80.44 kg/h. The oxygen stream 104 exiting the recuperator 424 exhibited a temperature of about 731° C. and a pressure of about 2758 kPa and had a mass flow of about 559.8 kg/h at a location between the solid-oxide electrolysis cells 414 and the recuperator 424.

After passing through the recuperator 424, the temperature of the oxygen stream 104 was reduced to about 77° C. Conventional ambient cooling 434 used to support the water knockout tank 436 further reduced the temperature of the oxygen stream 104, such that the oxygen stream 104 exhibited a temperature of about 21° C.

Example 2

High-Temperature Steam Electrolysis Injecting Hydrogen Gas into a Gasifier

Modeling was also conducted for a syngas production system 400 using a gasifier as the thermochemical conversion apparatus 406. The syngas production system 400 utilized the heat produced by thermochemical conversion of a carbonaceous fuel to support electrolysis using one or more solid-oxide electrolysis cells. For example, heat generated during the gasification of a carbonaceous fuel may be utilized to convert water to steam using a heat exchanger.

Referring to FIG. 4, conditions or "state points" of fluid flowing throughout the syngas production system 400 are now described. The input 102 including cellulose and oxygen stream 104 exhibited a pressure of about 2758 kPa, at a temperature of about 22° C. when entering the gasifier used as the thermochemical conversion apparatus 406. The mass flow rates of the input 102 and oxygen stream 104 were, respectively, about 583.7 kg/h and about 345.6 kg/h. The hydrogen stream 112 exiting the solid-oxide electrolysis cell array 414 included a mole fraction composition of about 0.0539 water and about 0.946 hydrogen and exhibited a temperature of about 762° C. and a mass flow of about 115.3 kg/h.

The product stream 410 exiting the gasifier included a mole fraction composition of about 0.221 water, about 0.5078 hydrogen, about 0.0322 carbon dioxide, about 0.2389 carbon monoxide, and 0.0001 methane. The product stream 410 exited the gasifier at a temperature of about 1371° C. and a pressure of about 2758 kPa and at a mass flow of about 1045 kg/h. The water shift reactor 432, as described above, converted carbon dioxide and hydrogen to carbon monoxide and water and, thus, the product stream 410' that exited the water shift reactor 432 included a mole fraction composition of about 0.2215 water, about 0.5073 hydrogen, about 0.0317 carbon dioxide, about 0.2394 carbon monoxide, and about 0.0001 methane.

After being passed through the recuperator 424, the product stream 410' exhibited a temperature about 459° C. before being passed through the water knockout tank 436. The syngas 140 exiting the water knockout tank 436 included a mole fraction composition of about 0.0013 water, about 0.6509 hydrogen, about 0.0406 carbon dioxide, about 0.3071 carbon monoxide, and about 0.0001 methane and exhibited a temperature of about 25° C. Table 2 provides a summary of the syngas constituents as well as efficiency data for syngas production using the syngas production system 400.

TABLE 2

| | |
|---|---|
| Hydrogen:Carbon Monoxide Ratio | 2.120:1 |
| Syngas Production Efficiency | 40.84% |
| gmol Syngas/(gmol Cellulose * Watt (electric)) | 6.548 |

A water stream 420 at a temperature of about 21° C. was passed through the recuperator 424 and exited the recuperator 424 as high-temperature steam 218 that exhibited a temperature of about 830° C. At a location between the mixing valve 413a and the solid-oxide electrolysis cell array 414, the feed stream 426 included a mole fraction composition of about 0.95 water and about 0.05 hydrogen.

An electrical current of about 2574 kW was provided to the solid-oxide electrolysis cell array 414 by a remote power source. The solid-oxide electrolysis cell array 414 included about $6.00 \times 10^4$ solid-oxide electrolysis cells, each having an area of about 225.0 cm$^2$ such that the current density was about 0.1505 amperes/cm$^2$. The hydrogen stream 112 exiting the solid-oxide electrolysis cell array 414 included a mole fraction composition of about 0.0539 water and about 0.9461 hydrogen and exhibited a temperature of 762° C. and a pressure of about 2758 kPa. The oxygen stream 104 exiting the solid-oxide electrolysis cell array 414 exhibited a temperature of 762° C. and a pressure of about 2758 kPa. After passing through the recuperator 424, the oxygen stream 104 exhibited a temperature of about 77° C. The excess oxygen 430 was passed through an ambient cooler 427 and exhibited a temperature of about 21° C. upon exiting the system.

Example 3

High-Temperature Co-Electrolysis of Steam and Carbon Dioxide Using a Gasifier

Modeling was also conducted for a syngas production system 500 using a gasifier as the thermochemical conversion apparatus 406. The syngas production system 500 utilized the heat generated during gasification of a carbonaceous fuel to support high temperature co-electrolysis of steam and carbon dioxide using one or more solid-oxide electrolysis cells.

Referring to FIG. 5, conditions or "state points" of fluid flowing throughout the syngas production system 500 are now described. Input 102 exhibited a pressure of about 2758 kPa, at a temperature of about 21° C. and at a mass flow rate of about 583.7 kg/h upon entering a gasifier employed as a thermochemical conversion apparatus 406. The input 102 was gasified to form a product stream 510 that included a mole fraction composition of about 0.277 water, about 0.1776 hydrogen, about 0.1776 carbon dioxide, and about 0.3679 carbon monoxide. Upon exiting the gasifier, the product stream 510 exhibited a temperature of about 1371° C. and a pressure of about 2758 kPa and had a mass flow of about 929.3 kg/h.

A water stream 420' entered the quencher 509 exhibited a temperature of about 21° C., a pressure of about 2758 kPa and a mass flow of about 12970 kg/h. The product stream 510' exited the quencher 509 at a temperature of about 65° C. and a pressure of about 2758 kPa. The product stream 510' was fed from the quencher 509 to the water knockout tank 436 at a mass flow of about 13900 kg/h.

The excess water 438 exiting the water knockout tank 436 included a mole fraction composition of about 0.9986 water and about 0.0013 carbon dioxide. The product stream 510" exiting the water knockout tank 436 included a mole fraction composition of about 0.011 water, about 0.2515 hydrogen, about 0.2174 carbon dioxide, and about 0.5201 carbon monoxide. At a location between the mixing valve 413a and the recuperator 424, the product stream 510''' included a mole fraction composition of about 0.5702 water, about 0.1093 hydrogen, about 0.0945 carbon dioxide, and about 0.226 carbon monoxide and exhibited a temperature of about 35° C. The product stream 510''' exited the recuperator 424 at a temperature of about 224° C. and a pressure of about 2758 kPa. The product stream 510''' was passed through the heater 642 such that the temperature was increased to about 726° C.

The product stream 510''' was passed to a water shift reactor 432, which, as described above, converted carbon monoxide and water to carbon dioxide and hydrogen. After being passed through the water shift reactor 432, the feed stream 426 included a mole fraction composition of about 0.4548 water, about 0.2247 hydrogen, about 0.2099 carbon dioxide, and about 0.1106 carbon monoxide.

The feed stream 426 entered the solid-oxide electrolysis cell array 414 at a temperature of about 827° C., a pressure of about 2758 kPa and a mass flow of about 1349 kg/h. The solid-oxide electrolysis cell array 414 had a current density of about 0.1690 amperes/cm$^2$ and included about $6.00 \times 10^4$ total cells, each with an area of about 225.0 cm$^2$.

The products of electrolysis were separated to form an oxygen stream 104 and syngas 140 that was flowed through and cooled by the recuperator 424. The oxygen stream 104 was passed from the recuperator 424 to another valve 428b at a temperature of about 57° C. such that oxygen entered the gasifier having a mass flow of about 346 kg/h.

The syngas 140' that exited the recuperator 424 included a mole fraction composition of about 0.0019 water, about 0.6776 hydrogen, about 0.0009 carbon dioxide, and about 0.319 carbon monoxide. The syngas 140' exhibited a temperature of about 57° C. at a pressure of about 2758 kPa and a mass flow of about 668.2 kg/h. Table 3 provides a summary of the syngas 140 constituents as well as efficiency data for syngas production using the gasifier in the syngas production system 500.

TABLE 3

| | |
|---|---|
| Hydrogen:Carbon Monoxide Ratio | 2.120:1 |
| Potential Electric Power Generation | 27.48 kW |
| Syngas Production Efficiency | 38.39% |
| gmol Syngas/(gmol Cellulose * Watt (electric)) | 5.897 |

Example 4

High-Temperature Co-Electrolysis of Steam and Carbon Dioxide Using a Combustor

Modeling was also conducted for a syngas production system 500 using a combustor as the thermochemical conversion apparatus 406. The syngas production system 500 employed a heat exchanger to harness the heat produced during thermochemical conversion of a carbonaceous fuel to support electrolysis using one or more solid-oxide electrolysis cells. For example, heat generated during the combustion of a carbonaceous fuel with oxygen may be utilized to perform high temperature co-electrolysis of steam and carbon dioxide using solid-oxide electrolysis cells.

Referring to FIG. 5, conditions or "state points" of fluid flowing throughout the syngas production system 500 are now described. The input 102 entered a combustor at a pressure of about 2758 kPa, a temperature of about 21° C. and at a mass flow rate of about 583.7 kg/h. The input 102 was combusted to form a product stream 510 that included a mole fraction composition of about 0.277 water, about 0.1776 hydrogen, about 0.1776 carbon dioxide, and about 0.3679 carbon monoxide. The product stream 510 exited the combustor at a temperature of about 1371° C., a pressure of about 2758 kPa and a mass flow of about 1274 kg/h. A water stream 420' at a temperature of about 21° C. and a pressure of about 2758 kPa was fed into the quencher 509 with the product stream 510 at a mass flow of 12970 kg/hr. The product stream 510' exiting the quencher 509 exhibited a temperature of about 78° C. at a pressure of about 2758 kPa. The product stream 510' was fed from the quencher 509 into the water knockout tank 436 at a mass flow of about 14240 kg/hr where waste water 438 was removed.

After removal of the waste water 438, the product stream 510'' exiting the water knockout tank 436 included a mole fraction composition of about 0.0209 water, about 0.0008 hydrogen, about 0.9752 carbon dioxide, and about 0.0032 carbon monoxide. The product stream 510'' was fed into a mixing valve 413a and mixed with water stream 420'' such that the product stream 510''' exiting the mixing valve 413a included a mole fraction composition of about 0.6792 water, about 0.0003 hydrogen, about 0.3195 carbon dioxide, and about 0.001 carbon monoxide.

The product stream 510''' exhibited a temperature of about 37° C. upon entering the recuperator 424. After exiting the recuperator 424 the product stream 510''' exhibited a temperature of about 296° C. at a pressure of about 2758 kPa. The product stream 510''' was passed through the heater 642. The product stream 510''' exiting the heater 642 was about 827° C.

The heated product stream 510''' was passed through the water shift reactor 432, which, as described above, converts carbon monoxide and water to carbon dioxide and hydrogen. Upon exiting the water shift reactor 432, the feed stream 426 included a mole fraction composition of about 0.6786 water, about 0.0009 hydrogen, about 0.3201 carbon dioxide, and about 0.0004 carbon monoxide. The feed stream 426 was directed into the solid-oxide electrolysis cell array 414 at a temperature of about 827° C., a pressure of about 2758 kPa and a mass flow of about 1461 kg/h. The solid-oxide electrolysis cell array 414 had a current density of about 0.1690 amperes/cm$^2$ and included about $6.00 \times 10^4$ total cells, each with an area of about 225.0 cm$^2$.

The products of electrolysis were separated to form an oxygen stream 104 and syngas 140 that were flowed through and cooled by the recuperator 424. At a location between the recuperator 424 and another valve 428b, the oxygen stream 104 exhibited a temperature of about 57° C. and a mass flow of about 886 kg/h.

The syngas 140' exiting the recuperator 424 included a mole fraction composition of about 0.0002 water, about 0.6794 hydrogen, about 0.0001 carbon dioxide, and about 0.3204 carbon monoxide. The syngas 140' exhibited a temperature of about 57° C. at a pressure of about 2758 kPa and a mass flow of about 574.4 kg/h. Table 4 provides a summary of the syngas 140 constituents as well as efficiency data for the syngas production system 500.

TABLE 4

| | |
|---|---|
| Hydrogen:Carbon Monoxide Ratio | 2.120:1 |
| Potential Electric Power Generation | 465.7 kW |
| Syngas Production Efficiency | 29.13% |
| gmol Syngas/(gmol Cellulose * Watt (electric)) | 4.305 |

Example 5

High Temperature Steam Electrolysis Using Pyrolyzer

Modeling was also been conducted for a syngas production system 600 that utilized the heat produced during pyrolyzation of a carbonaceous fuel to support electrolysis using one or more solid-oxide electrolysis cells.

Referring to FIG. 6, conditions or "state points" of fluid flowing throughout the syngas production system 600 are now described. The input 102 was fed into the pyrolyzer 606 at a temperature of about 21° C., a pressure of about 2758 kPa and a mass flow of about 583.7 kg/h. After pyrolyzation, the product stream 610 included a mole fraction composition of about 0.0077 water, about 0.305 hydrogen, about 0.0078 carbon dioxide, about 0.5495 carbon monoxide and 0.13 methane. Before entering the mixing valve 413a, the product stream 610 exhibited a temperature of about 1027° C. at a pressure of about 2758 kPa and a mass flow of about 583.7 kg/h.

The water stream 420 exhibiting a temperature of about 21° C., a pressure of about 101.3 kPa and a mass flow about 561.5 kg/h was passed through and heated by the recuperator 424 to form high-temperature steam 218. Upon exiting the recuperator 424, the high-temperature steam 218 had a temperature of 814° C., a pressure of about 3000 kPa and a mass flow of about 561.5 kg/h. The high-temperature steam 218 was fed into the mixing valve 413b with another portion 112″ of the hydrogen stream 112 to form a feed stream 426 that included a mole fraction composition of about 0.95 water and about 0.05 hydrogen.

The feed stream 426 was passed through the solid-oxide electrolysis array 414 at a temperature of about 827° C. at a pressure of about 3000 kPa and had a mass flow of about 566.4 kg/h. The solid oxide-electrolysis cell array 414 had a current density of about 0.2480 amperes/cm$^2$ and included about $1.00 \times 10^5$ total cells, each with an area of about 64.0 cm$^2$. The oxygen stream 104 and the hydrogen stream 112 exited the solid-oxide electrolysis cell array 414 at a temperature of about 1142° C. The oxygen stream 104 was passed through the recuperator 424 and was cooled to a temperature of about 197° C. The hydrogen stream 112 exited the solid-oxide electrolysis cell array 414 and was split into the portion 112′ of the hydrogen stream 112 and the other portion 112″ of the hydrogen stream 112. Hydrogen streams 112′ and 112″ exited valve 428a, referred to herein as a flow splitting device at a temperature of 1142° C. and at a pressure of 3000 kPa and a mass flow rate of 87.8 kg/h and 4.9 kg/h, respectively.

The product stream 610′ was fed into a mixing valve 413a with the portion of the hydrogen stream 112′, which exhibited a temperature of about 1142° C., a pressure of about 3000 kPa and a flow rate of about 87.77 kg/h. Upon exiting the mixing valve 413b, the product stream 610′ included a mole fraction composition of about 0.0288 water, about 0.6262 hydrogen, about 0.0039 carbon dioxide, about 0.2759 carbon monoxide and 0.0653 methane.

The product stream 610′ was passed through the water shift reactor 432 that converted carbon dioxide and hydrogen in the product stream 610′ to carbon monoxide and water, which exited as syngas 140. The syngas 140 exiting the water shift reactor 432 included a mole fraction composition of about 0.027 water, about 0.628 hydrogen, about 0.0057 carbon dioxide, about 0.2741 carbon monoxide and about 0.0653 methane. At a location between the water shift reactor 432 and the recuperator 424, the syngas 140 exhibited a temperature of about 1080° C. at a pressure of about 2758 kPa and has a mass flow of about 671.5 kg/h. Upon exiting the recuperator 424, the syngas 140 was at a temperature of about 214° C. Table 5 provides a summary of the syngas 140 constituents as well as efficiency data for the syngas production system 600.

TABLE 5

| | |
|---|---|
| Hydrogen:Carbon Monoxide Ratio | 2.291 |
| Syngas Production Efficiency | 44.29% |

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A method for forming syngas, comprising:
   producing heat and a mixed gas comprising carbon dioxide, carbon monoxide, water and hydrogen by gasifying a carbonaceous fuel;
   condensing the mixed gas to remove at least one impurity from the mixed gas and to generate a feed stream;
   after the condensing act, transferring the heat produced by gasifying the carbonaceous fuel to the feed stream to convert at least a portion of the water in the feed stream to steam;
   introducing the feed stream to at least one solid-oxide electrolysis cell;
   electrolyzing carbon dioxide and steam in the feed stream in at least one solid-oxide electrolysis cell to produce carbon monoxide, hydrogen and oxygen; and
   separating the carbon monoxide and hydrogen from the oxygen.

2. The method of claim 1, further comprising transferring heat from the carbon monoxide, hydrogen and oxygen produced in the at least one solid-oxide electrolysis cell to the feed stream.

3. The method of claim 1, further comprising contacting the mixed gas with a water stream having a temperature substantially lower than a temperature of the mixed gas to cool the mixed gas.

4. The method of claim 1, wherein producing heat and a mixed gas comprising carbon dioxide, carbon monoxide, water and hydrogen by gasifying a carbonaceous fuel comprises gasifying the carbonaceous fuel in the presence of a portion of the oxygen formed by electrolyzing carbon dioxide and steam to control a ratio of carbon monoxide and hydrogen produced by electrolyzing the carbon dioxide and the steam.

\* \* \* \* \*